United States Patent [19]

Naito et al.

[11] Patent Number: 5,305,450
[45] Date of Patent: Apr. 19, 1994

[54] METHOD OF SOFTWARE STANDARDIZATION BY UNIFYING AND STANDARDIZING THE NAMES AND ATTRIBUTES OF DATA ITEMS IN DEVELOPED SOFTWARE

[75] Inventors: Ichiro Naito, Tokyo; Hirofumi Danno, Yokohama; Kenichi Ohta, Kiyose, all of Japan

[73] Assignees: Hitachi Ltd.; Hitachi Microcomputer System Ltd., Tokyo, Japan

[21] Appl. No.: 682,920

[22] Filed: Apr. 9, 1991

[30] Foreign Application Priority Data

Apr. 12, 1990 [JP] Japan ................................ 2-097076

[51] Int. Cl.$^5$ .......................................... G06F 15/40
[52] U.S. Cl. ............................ 395/500; 364/DIG. 1; 364/973; 364/286
[58] Field of Search ................. 364/DIG. 1 MS File, 364/DIG. 2 MS File; 395/325, 375, 500, 600, 650, 700, 800

[56] References Cited

U.S. PATENT DOCUMENTS 4,833,641  5/1989  Lerner ........................ 364/DIG. 2
4,967,348  10/1990  Naito et al. .................... 395/600
5,157,600  10/1992  Lerner ........................ 364/DIG. 1

OTHER PUBLICATIONS

Kozo Bannai, et al., "A Total Approach to a Solution for the Maintenance Problems through Configuration Management-Maintenance Support Facility MSF", Central Research Institute of Electric Power Industry, Compsac 83 Proc., Nov. 1983, pp. 404–411. (Provided in English).

"Tools to Rejuvenate Your Old Systems", EDP Analyzer, vol. 22, No. 4, Apr. 1984, pp. 1–14. (Provided in English).

Primary Examiner—Robert B. Harrell
Attorney, Agent, or Firm—Fay, Sharpe, Beall, Fagan, Minnich & McKee

[57] ABSTRACT

In a system for data processing by use of a processing language controlled by a job control program for coupling a file having at least one data item to a data set, a method of standardizing data items in an existing program stored in a storage and having a procedure part and a data definition part is disclosed. The names of two data items including the source and destination items of moving in the transfer designated in a plurality of data transfer instructions in an existing program are stored in the storage, and the equivalence number attached to the name of the transfer source item of each of the plurality of data transfer instructions is attached to the name of the transfer destination item. If a plurality of files assigned in the data definition part are defined in a single data set, the file equivalence number is attached to the plurality of files in the storage. The starting position and length of the data items are stored in the storage on the basis of the data length for the data item name in the data definition part, and the data item name is changed on the basis of the relative positions therebetween and the equivalence number thereof.

20 Claims, 33 Drawing Sheets

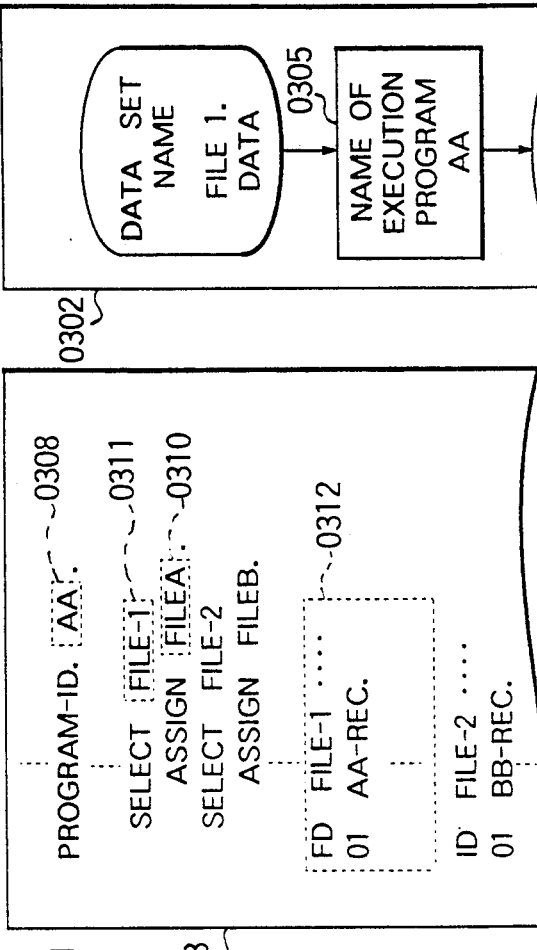
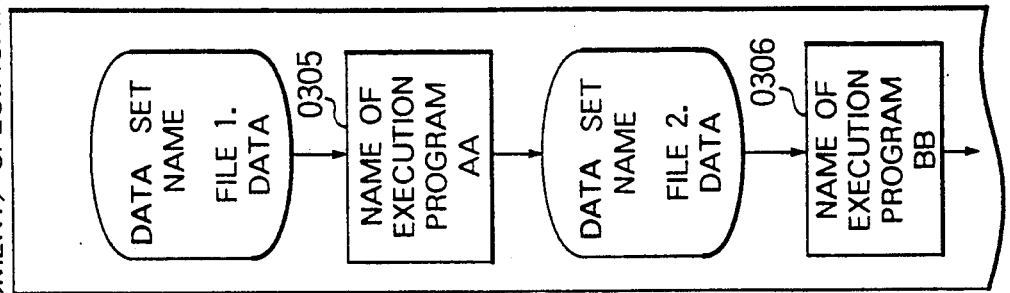
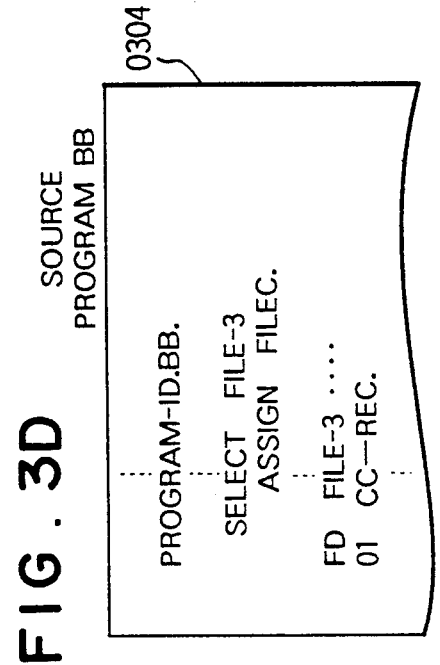
FIG. 3A  FIG. 3B  FIG. 3C  FIG. 3D

FIG. 4

MEMORY INFORMATION OBTAINED BY
ANALYZING JOB CONTROL PROGRAM
301 IN FIG.3A

| | PROGRAM NAME | DD-NAME | DATA SET NAME | .... | |
|---|---|---|---|---|---|
| 0401 — | A A | F I L E A | FILE1.DATA | | — 0403 |
| 0404 — | A A | F I L E B | FILE2.DATA | | — 0406 |
| 0407 — | B B | F I L E C | FILE2.DATA | | — 0409 |
| | ⋮ | ⋮ | ⋮ | | |

0402 (DD-NAME column)
0405, 0408

FIG. 5

EQUIVALENCE NUMBER ATTACHED TO EQUIVALENT
DATA DETECTED FROM MEMORY INFORMATION
IN FIG.4

| FILE EQUIVALENCE NUMBER ATTACHED TO FILES IN EQUIVALENT RELATIONSHIP | PROGRAM NAME | DD-NAME | .... |
|---|---|---|---|
| 1 | A A | F I L E B | |
| 1 | B B | F I L E C | |
| | | | |

0501 — (first row equivalence number)
0502 — PROGRAM NAME column
0503 — FILE B entry
0504 — BB entry
0505 — FILE C entry

FIG. 6

DATA DIVISION

```
PROGRAM-ID. AA.
              SELECT  FILE-1  ASSIGN  FILEA.
              SELECT  FILE-2  ASSIGN  FILEB.

FD  FILE-1 ····
01  AA-REC.                          ----0602
   02  SALES-SLIP     PIC  9(3).
   02  WARES-CODE     PIC  X(5).     ----0601
   02  DATE.
      03  YEAR        PIC  99.
      03  MONTH       PIC  99.
      03  DAY         PIC  99.

FD  FILE-2 ····
01  BB-REC.
   02  SLIP-NO        PIC  9(3).
   02  GOODS          PIC  X(5).
   02  SALES-PRICE    PIC  9(6).
   02  SALES-DAY      PIC  99.

WORKING-STORAGE SECTION.

01  SALES-DATE.
   02  MONTH-S        PIC  99.
   02  DAY-S          PIC  99.
   02  DAY-X          PIC  XX  REDEFINES  DAY-S.

01  TRANSACTION-DATE.
   02  MONTH-T        PIC  99.
   02  DAY-T          PIC  99.
```

FIG. 7

PROCEDURE DIVISION

PROCEDURE DIVISION.

MOVE WARES-CODE TO GOODS.

MOVE MONTH TO MONTH-T.

MOVE DAY TO DAY-T.  ~~~0706

MOVE SALES-SLIP TO SLIP-NO. ~~~0703

MOVE TRANSACTION-DATE  ~~0705
            TO SALES-DATE.

COMPUTE SALES-PRICE =
              UNIT-COST * NUMBER.

MOVE DAY-S TO SALES-DAY.    0704

~0702
   WRITE BB-REC.
                         ~0701

FIG. 8
ANALYSYS RESULTS FOR DATA DEFINITION PART

| PROGRAM NAME | 01-LEVEL ITEM NAME | ITEM NAME | STARTING POSITION | LENGTH | DD-NAME | |
|---|---|---|---|---|---|---|
| AA | AA-REC | AA-REC | 1 | 80 | FILEA | |
| AA | AA-REC | SALES-SLIP | 1 | 3 | FILEA | ~0803 |
| AA | AA-REC | WARES-CODE | 4 | 5 | FILEA | ~0801 |
| AA | AA-REC | DATE | 9 | 6 | FILEA | |
| AA | AA-REC | YEAR | 9 | 2 | FILEA | |
| AA | AA-REC | MONTH | 11 | 2 | FILEA | |
| AA | AA-REC | DAY | 13 | 2 | FILEA | |
| | ⋮ | ⋮ | | | | |
| AA | BB-REC | BB-REC | 1 | 65 | FILEB | |
| AA | BB-REC | SLIP-NO | 1 | 3 | FILEB | ~0802 |
| AA | BB-REC | GOODS | 4 | 5 | FILEB | |
| AA | BB-REC | SALES-PRICE | 9 | 6 | FILEB | |
| AA | BB-REC | SALES-DAY | 15 | 2 | FILEB | ~0804 |
| | ⋮ | ⋮ | | | | |
| AA | SALES-DATE | SALES-DATE | 1 | 4 | | ~0807 |
| AA | SALES-DATE | MONTH-S | 1 | 2 | | |
| AA | SALES-DATE | DAY-S | 3 | 2 | | ~0805 |
| AA | SALES-DATE | DAY-X | 3 | 2 | | ~0806 |
| AA | TRANSACTION-DATE | TRANSACTION-DATE | 1 | 4 | | ~0808 |
| AA | TRANSACTION-DATE | MONTH-T | 1 | 2 | | |
| AA | TRANSACTION-DATE | DAY-T | 3 | 2 | | ~0809 |
| | | | | | | |

FIG. 9

EQUIVALENT DATA ITEM
INFORMATION IN MEMORY

| DATA ITEM EQUIVA- LENCE NUMBER | PRO- GRAM NAME | 01-LEVEL ITEM NAME | ITEM NAME | | POSITION | LENGTH | DATA SET NAME | |
|---|---|---|---|---|---|---|---|---|
| 1 | AA | BB-REC | SLIP-NO | | | | FILE2. DATA | ~0901 |
| 1 | AA | AA-REC | SALES-SLIP | | | | FILE1. DATA | |
| 2 | AA | BB-REC | GOODS | | | | FILE2. DATA | |
| 2 | AA | AA-REC | WARES- CODE | | | | FILE1. DATA | |
| 3 | AA | BB-REC | SALES-DAY | | | | FILE2. DATA | ~0902 |
| 3 | AA | SALES-DATE | DAY-S | | | | | |
| 3 | AA | SALES-DATE | DAY-X | | | | | ~0903 |
| 3 | AA | SALES-DATE | SALES-DATE | | 3 | 2 | | ~0904 |
| 3 | AA | TRANSACTION- DATE | TRANSACTION- DATE | | 3 | 2 | | ~0905 |
| 3 | AA | TRANSACTION- DATE | DAY-T | | | | | ~0906 |
| 3 | AA | AA-REC | DAY | | | | FILE1. DATA | ~0907 |
| 4 | BB | CC-REC | CC-REC | | | | FILE2. DATA | |
| 4 | AA | BB-REC | BB-REC | | | | FILE2. DATA | |
| 1 | BB | CC-REC | SLIP-NUM | | | | FILE2. DATA | ~0908 |
| 2 | BB | CC-REC | GOODS- CODE | | | | FILE2. DATA | |
| 5 | BB | CC-REC | SALES-$ | | | | FILE2. DATA | |
| 5 | AA | BB-REC | SALES- PRICE | | | | FILE2. DATA | |
| 3 | BB | CC-REC | SALES- PRICE | | | | FILE2. DATA | |
| | | | | | | | | |

FIG. 10

```
PROGRAM-ID.  BB.

FD   FILE-3 ····
01   CC-REC.
     02   SLIP-NUM        PIC   9(3).
     02   GOODS-CODE      PIC   X(5).
     02   SALES-S         PIC   9(6).
     02   SELLING-DATE    PIC   XX.
```

FIG. 11

| PROGRAM NAME | 01-LEVEL ITEM NAME | ITEM NAME | STARTING POSITION | LENGTH | FILE ASSIGNMENT NAME |
|---|---|---|---|---|---|
| AA | BB-REC | BB-REC | | 65 | FILEB |
| AA | BB-REC | SLIP-NO | 1 | 3 | FILEB |
| AA | BB-REC | GOODS | 4 | 5 | FILEB |
| AA | BB-REC | SALES-PRICE | 9 | 6 | FILEB |
| AA | BB-REC | SALES-DAY | 15 | 2 | FILEB |
| ... | ... | ... | ... | ... | ... |
| BB | CC-REC | CC-REC | | 65 | FILEC |
| BB | CC-REC | SLIP-NUM | 1 | 3 | FILEC |
| BB | CC-REC | GOODS-CODE | 4 | 5 | FILEC |
| BB | CC-REC | SALES-$ | 9 | 6 | FILEC |
| BB | CC-REC | SELLING-DATE | 15 | 2 | FILEC |
| ... | ... | ... | ... | ... | ... |

1101 (top portion: AA rows), 1102 (top portion: BB rows), 1103 (SLIP-NO row), 1104 (SLIP-NUM row)

FIG. 12

EQUIVALENT DATA ITEM INFORMATION

| ITEM NO. | PROGRAM NAME | ITEM NAME |
|---|---|---|
| 1 | AA | SLIP-NO |
| 2 | AA | SALES-SLIP |
| 3 | BB | SLIP-NUM |
| ⋮ | | ⋮ |

DESIGNATE ITEM NO. OF NAME DETERMINED OR A NEW NAME _____

FIG. 13

| PROGRAM NAME | 01-LEVEL ITEM NAME | ITEM NAME | ... | STANDARD DATA |
|---|---|---|---|---|
| | | | | EQUIVALENT DATA ITEM INFORMATION ALREADY DETERMINED |
| AA | BB-REC | SLIP-NO | | SALES-SLIP-NO |
| AA | AA-REC | SALES-SLIP | | SALES-SLIP-NO |
| BB | CC-REC | SLIP-NUM | | SALES-SLIP-NO |
| ... | ... | ... | | ... |
| AA | BB-REC | GOODS | | GOODS-CODE |
| AA | AA-REC | WARE-CODE | | GOODS-CODE |
| BB | CC-REC | GOODS-CODE | | GOODS-CODE |
| ... | ... | ... | | ... |

```
01  AA-REC                1401
    02  SALES-SLIP-NO     PIC  9(3).
    02  GOODS-CODE        PIC  X(5).

PROCEDURE DIVISION.

MOVE GOODS-CODE OF AA-REC
        TO GOODS-CODE OF BB-REC
```

ANALOGOUS ITEM NAME

FIG. 17

| EQUIVA-LENCE NO. | EQUIVA-LENCE LEVEL | PROGRAM NAME | 01-LEVEL ITEM NAME | ITEM NAME | |
|---|---|---|---|---|---|
| ..... | ..... | ..... | ..... | ..... | |
| 1 | 1 | AA | BB-REC | DEN-NO | |
| 1 | 1 | AA | AA-REC | DENPYO | |
| ..... | ..... | ..... | ..... | ..... | |

FIG. 18

| EQUIVA-LENCE NO. | EQUIVA-LENCE LEVEL | PROGRAM NAME | 01-LEVEL ITEM NAME | ITEM NAME | EQUIVALENCE LEVEL FOR ANALOGOUS ITEM NAMES |
|---|---|---|---|---|---|
| 1 | 1 | AA | BB-REC | DEN-NO | |
| 1 | 2 | AA | AA-REC | DENPYO | |
| 1 | 2 | AA. | XX-REC | DENBAN | |
| 1 | 2 | AA | XX-REC | DEN-N | |
| 1 | 2 | AA | XX-REC | DENP-NUM | |
| ...... | ...... | ...... | ...... | ...... | ...... |

| ITEM NO. | PROGRAM NAME | ITEM NAME | EQUIVALENCE LEVEL | NEW ITEM NAME |
|---|---|---|---|---|
| 1 | AA | DEN-NO | 1 | — |
| 2 | AA | DENPYO | 2 | — |
| 3 | AA | DENBAN | 2 | — |
| 4 | AA | DEN-NUM | 2 | — |
| 5 | AA | DENPNUM | - | — |
| 6 | AA | DENPYO-NO | - | — |
| ⋮ | ⋮ | ⋮ | ⋮ | |

~1901

DESIGNATE ITEM NO. OF NAME DETERMINED OR NEW NAME
_____

DESIGNATE NUMBER OF THE ITEM CHANGED TO STANDARD DATA NAME
_____

DESIGNATE NEW ITEM NAME FOR ITEMS CHANGED IN NAME WITHOUT BEING CHANGED TO STANDARD DATA NAME
_____

STANDARDIZATION OF EQUIVALENT DATA ITEM NAMES USING EQUIVALENT DATA EXTRACTED FROM SOURCE PROGRAMS FOR A PLURALITY OF JOB CONTROL PROGRAMS

FIG. 21

FILE EQUIVALENT DATA

| EQUIVA-LENCE NO. | PROGRAM NAME | FILE ASSIGNMENT NAME | INTERNAL FILE NAME | .... |
|---|---|---|---|---|
| 1 | AA | FILEB | FILE-2 | .... |
| 1 | AA | FILEC | FILE-3 | .... |
| ⋮ | ⋮ | ⋮ | ⋮ | |

FIG. 22

| EQUIVALENCE NO. | PROGRAM NAME | FILE NAME | EQUIVALENCE LEVEL |
|---|---|---|---|
| 1 | A A | F I L E - 2 | 1 |
| 1 | B B | F I L E - 3 | 1 |
| ⋮ | ⋮ | ⋮ | ⋮ |

| EQUIVALENCE NO. | PROGRAM NAME | ITEM NAME | EQUIVALENCE LEVEL |
|---|---|---|---|
| 1 | A A | D E N - N O | 1 |
| 1 | A A | D E N P Y O | 2 |
| ⋮ | ⋮ | ⋮ | ⋮ |

FIG. 24

STANDARD DATA CORRESPONDENCE TABLE

| STANDARD DATA | CORRESPONDING EQUIVALENCE NO. |
|---|---|
| SLIP-NO | 1 |
| GOODS | 2 |
| SALES-DAY | 3 |
| BB-REC | 4 |
| SALES-PRICE | 5 |

FIG. 26

STANDARD DATA REGISTRATION TABLE

| STANDARD DATA | FILE SET | STARTING POSITION | LENGTH |
|---|---|---|---|
| SALES-SLIP-NO | FILE A | 1 | 3 |
| GOODS | FILE B | 4 | 5 |
| SALES-DAY | FILE B | 15 | 2 |
| BB-REC | FILE B | 1 | 65 |
| SALES-PRICE | FILE B | 9 | 6 |

FIG. 27

| EQUIVA-LENCE NO. | PRO-GRAM NAME | .... | ITEM NAME | STARTING PO-SITION | LENGTH | .... | FILE SET |
|---|---|---|---|---|---|---|---|
| 1 | AA | | SLIP-NO ~3101 | 1 | 3 | | FILE A ~3104 |
| 1 | AA | | SALES-SLIP ~3105 | 1 | 3 | | FILE A |
| 2 | AA | | GOODS ~3106 | 4 | 5 | | FILE B |
| 2 | AA | | WARES-CODE ~3107 | 4 | 5 | | FILE A |
| 3 | AA | | SALES-DAY ~3108 | 15 | 2 | | FILE B |
| 3 | AA | | DAY-S | 3 | 2 | | |
| 3 | AA | | DAY-X | 3 | 2 | | |
| 3 | AA | | SALES-DATE | 1 | 4 | | |
| 3 | AA | | TRANSACTION-DATE | 1 | 4 | | |
| 3 | AA | | DAY-T | 3 | 2 | | |
| 3 | AA | | DAY | 13 | 2 | | FILE A |
| 4 | BB | | CC-REC | - | - | | - |
| 4 | AA | | BB-REC ~3109 | 1 | 65 | | FILE B |
| 1 | BB | | SLIP-NUM ~3110 | - | - | | - |
| 2 | BB | | GOODS-CODE ~3111 | - | - | | - |
| 5 | BB | | SALES-$ ~3112 | - | - | | - |
| 5 | AA | | SALES-PRICE | 9 | 6 | | - |
| 3 | BB | | SALES-PRICE | - | - | | - |

FIG. 29

SELECT FROM THE FOLLOWING EXISTING DATA THE HIGHEST LEVEL OF STANDARD DATA TO BE USED, AND INPUT NAME OR NUMBER IN PARENTHESIS

1. M-REC
2. NAME
3. TIME
4. HOUR
5. MINUTE
6. SECOND
7. N-REC

NAME OF STANDARD DATA
OF HIGHEST LEVEL      ( TIME )
                           |
                         2701

FIG. 30

| EQUIVA-LENCE NO. | PROGRAM NAME | 01-LEVEL ITEM NAME | ITEM NAME | STARTING POSITION | LENGTH | ... | FILE SET NAME |
|---|---|---|---|---|---|---|---|
| 1 | MM | M-REC | M-REC | 1 | 10 | | FILE3.DATA |
| 2 | MM | M-REC | NAME | 1 | 4 | | FILE3.DATA |
| 3 | MM | M-REC 3301 | TIME 3302 | 5 3303 | 6 3304 | | FILE3.DATA |
| 4 | MM | M-REC | HOUR 3305 | 5 | 2 | | FILE3.DATA |
| 5 | MM | M-REC | MINUTE 3306 | 7 | 2 | | FILE3.DATA |
| 6 | MM | M-REC | SECOND 3307 | 9 | 2 | | FILE3.DATA |
| 1 | NN | N-REC | N-REC | 1 | 10 | | FILE4.DATA |
| 2 | NN | N-REC | NAM | 1 | 4 | | FILE4.DATA |
| 3 | NN | N-REC | HH | 5 | 6 | | FILE4.DATA |
| 4 | NN | N-REC | HR | 5 | 2 | | FILE4.DATA |
| 5 | NN | N-REC | MNT | 7 | 2 | | FILE4.DATA |
| 6 | NN | N-REC | SEC | 9 | 2 | | FILE4.DATA |

FIG. 31

STANDARD DATA CORRESPONDENCE TABLE

| STANDARD DATA | CORRESPONDING EQUIVALENCE NO. |
|---|---|
| TIME | 3 |
| HOUR | 4 |
| MINUTE | 5 |
| SECOND | 6 |

FIG. 33

MATCHING CHECK TABLE

| PROGRAM | NAME OF MISMATCHED | STANDARD NAME | |
|---|---|---|---|
| AA | SLIP-NO | SALES-SLIP-NO | 3003 |
| AA | SALES-SLIP | SALES-SLIP-NO | |
| AA | SLIP-NUM | SALES-SLIP-NO | |
| AA | WARES-CODE | GOODS | 3004 |
| BB | GOODS-CODE | GOODS | |
| AA | DAY-S | SALES-DAY | 3005 |
| AA | DAY-X | SALES-DAY | |
| AA | SALES-DATE | SALES-DAY | |
| AA | TRANSACTION-DATE | SALES-DAY | |
| AA | DAY-T | SALES-DAY | |
| AA | DAY | SALES-DAY | |
| BB | SALES-PRICE | SALES-DAY | |
| BB | CC-REC | BB-REC | 3006 |
| BB | SALES-S | SALES-PRICE | 3007 |

3001

| PROGRAM NAME | NUMBER OF NON-COINCIDENT NAMES |
|---|---|
| AA | 8 |
| BB | 3 |
| | |
| | |

3002

METHOD OF SOFTWARE STANDARDIZATION BY UNIFYING AND STANDARDIZING THE NAMES AND ATTRIBUTES OF DATA ITEMS IN DEVELOPED SOFTWARE

CROSS REFERENCE TO OTHER APPLICATIONS

This invention is related to a U.S. patent application Ser. No. 271,728 entitled "DATA NAME STANDARDIZING SYSTEM" and filed on Nov. 15, 1988 under claiming priority of Japanese Patent Application No. 62-292117 filed on Nov. 20, 1987 in Japan, and issued to them as a U.S. Pat. No. 4,967,348 and a U.S. patent application Ser. No. 409,527, now abandoned, entitled "INTRA-PROGRAM DATA REPLACEMENT METHOD AND SYSTEM" and filed by I. Naito et al. on Sep. 19, 1989 under claiming priority of Japanese Patent Application No. 63-234981 filed on Sep. 21, 1988 in Japan, the disclosure of which are incorporated herein by reference.

BACKGROUND OF THE INVENTION

The present invention relates to a method of software standardization, or more in particular to a method of software standardization suitable for improving the efficiency of the maintenance work on a software that has already been developed, by unifying and standardizing the names and attributes of data items in the developed software.

Conventional effective methods of improving the efficiency of the program rewriting, maintenance, reuse and version-up work of a paperwork processing software that has already been developed, that is, the work of expanding the maintenance functions and reconstruction or shift to a new system include the one in which a developed software is converted into a standard form easy to maintain and reuse. Especially in reusing a paperwork processing software already developed, an effective approach is to standardize and unify the names and attributes of data items having the same contents used in the already-developed software.

A useful conventional system supporting this approach concerns a method proposed by the present inventors in U.S. Pat. No. 4,967,348 entitled "INTRA-PROGRAM DATA REPLACEMENT METHOD AND SYSTEM". According to this method, data items having the same contents in an existing software are detected by detecting the relationship of transfer between data items in the existing software. This is a superior method making it possible to support the whole series of work of detecting data items having the same contents, determining a standard data item and name, and replacing the names and attributes of data items in the program by the standard name and attribute, as necessary for standardizing the names and attributes of data items in an existing software.

SUMMARY OF THE INVENTION

The object of the present invention is generally to improve the efficiency of the maintenance work on an object software by efficient standardization and unification of names and attributes of data items of a software already developed.

According to the present invention, the standardization and maintenance work are further improved by solving the following problems:

(1) In collective transfer by reference to an upper data item for example, it is necessary to solve the problems of the impossibility of discriminating lower data items at origins and designations of transfer having the same contents, by detecting the relationship of not only the transfer of an object data item but also the transfer relationship by referring to the data items assigned to the same physical position, thereby further improving the efficiency of the work of detecting equivalent data items.

(2) In addition to discriminating equivalent data items only by detecting the data transfer relationship, it may be necessary to discriminate the data transferred from any of a plurality of mutually different data items. In such a case, the efficiency of the work of detecting equivalent data items is required to be further improved by recognizing readily that such data items are less likely to have the same name and attribute.

(3) Also, it is necessary to estimate and propose data items having the same contents by the analogy of names, so that data items having no transfer relationship but having the same contents are readily detectable, thereby further improving the efficiency of the work of detecting equivalent data items.

(4) It is also necessary to make it possible to propose to the user data item candidates which should have the same name and attribute as the above-mentioned equivalent data items, so that the user may readily decide the data items which are equivalent to each other, thereby detecting equivalent data items and further improving the efficiency of the work of determining the name and attribute of a standard data item.

(5) Further, it is necessary to accumulate information on equivalent data items obtained by analysis of a part of programs of an existing software to prepare equivalent data item information combined with the one obtained by analysis of other parts of the programs, thereby determining the name and attribute of a standard data item. In this way, the work on a software large in scale may be effected in divisible fashion, thereby further improving the efficiency of the standardization of data items in an existing software.

(6) Furthermore, it is necessary to determine the name and attribute of a data item to be used as a standard in advance, so that data items in an existing software to be replaced by the standard data item may be readily detectable and replaceable, thus reducing the possibility of erroneous determination of the name and attribute of a standard data item.

(7) The name and attribute of a data item to be used as a standard needs to be readily determinable on the basis of the data item information in an existing software, thereby further reducing the number of steps for determining the name and attribute of a standard data item.

(8) In addition, it is necessary to make it possible to check the matching by collating the data item names in an object software with the name and attribute of a standard data item, thereby permitting ready confirmation of whether or not the data item names are correctly standardized.

The present invention has been made in view of the above-mentioned facts, and a first object thereof is to reduce detection failure of an equivalent data item which otherwise might be detected by data transfer relationship, and thereby to improve the efficiency of the work of standardizing the names and attributes of data items in an existing software.

A second object of the present invention is to reduce, in detecting candidates of equivalent data items by detection of data transfer relationship, an erroneous decision that data transferred from a given one of a plurality of different data items to a single data item is an equivalent one, and thereby to improve the efficiency of the work of standardizing the names and attributes of data items in an existing software.

A third object of the present invention is to reduce the detection failure of equivalent data items by detecting candidates of equivalent data from the analogy of names, and thereby to improve the efficiency of the work of standardizing the names and attributes of data items in an existing software.

A fourth object of the present invention is to reduce the erroneous decision on an equivalent data item by proposing to the user a data item candidate which should have the same name and attribute as an equivalent data item, thereby improving the efficiency of the work of standardizing the names and attributes of data items in an existing software.

A fifth object of the present invention is to make possible the detection work of equivalent data in divisible way when a software large in scale is involved, and thereby to improve the efficiency of the work of standardizing the names and attributes of data items in an existing software.

A sixth object of the present invention is to reduce the possibility of determining the name and attribute of a standard data item erroneously, by determining the name and attribute of a data item used as a standard and detecting and replacing a data item in an existing software with the standard data item, and thereby to improve the efficiency of the work of standardizing the names and attributes of data items in an existing software.

A seventh object of the present invention is to reduce the number of steps for determining the name and attribute of a standard item by facilitating the determination of the name and attribute of a data item to be used as a standard on the basis of data item information in an existing software, and thereby to improve the efficiency of the work of standardizing the names and attributes of data in the existing software.

An eighth object of the present invention is to make it possible to check the matching and readily confirm the correct conversion of a data item name by collating the names and attributes of data items in an object software with the name and attribute of a standard data item, and thereby to improve the efficiency of the work of standardizing the names and attributes of data items in an existing software.

In order to achieve the above-mentioned first object of the invention, there is provided a method of software standardization in which a mass of data items correlated with each other in transfer with or without an intermediate data item is detected as a mass of mutually equivalent data items by analyzing an existing software and checking the data transfer relationship, the name and attribute of a standard data item are determined for the mass of equivalent data items, and the place of use and definition of each data item belonging to the mass of the equivalent data in an existing software are converted to the name and attribute of the standard data item thus determined, the method of software standardization being characterized in that data definition information is analyzed to calculate a physically relative position of each data item, and another data item sharing the same position physically as each data item is detected and included in the mass of the equivalent data items.

Also, another data item having data transfer relationship is detected by the data transfer relationship and included in the mass of equivalent data items with or without an intermediate data item between a given data item and another data item sharing the same physical position mentioned above.

Further, still another data item sharing the same physical position as the above-mentioned another data item having data transfer relationship is detected by calculating the physical relative positions of data items and included in the mass of equivalent data items.

Furthermore, the relationship in physical position and length between an original data item and another data item having the same physical position is compared with the relationship in physical position and length between the above-mentioned another data item and still another data item sharing the same physical position, so that still another data item having no data transfer relationship with the original data item is detected and excluded to prepare a mass of equivalent data items.

In addition, the physically identical one of all the files defined in another program is detected by analysis of a job control parameter and a common procedure, so that of all the data items belonging to the file, those sharing a physical position with each other are detected and included in the mass of equivalent data items.

In order to achieve the second object of the present invention, there is provided a method of software standardization characterized in that in detecting a candidate of equivalent data item by detection of the data transfer relationship mentioned above, a case of transfer of data to a given data item from a plurality of data items is detected, in which case information indicating a low possibility of being an equivalent data item is proposed to the user.

In order to achieve the third object of the present invention, there is provided a method of software standardization characterized in that data item names are compared and those data items having analogous names are detected as candidates of equivalent data items.

In order to achieve the fourth object of the present invention, there is provided a method of software standardization characterized in that in proposing a candidate of data item which should have the identical name and attribute as the above-mentioned equivalent data item, priority level information for the particular data item different depending on the method of detecting the candidate of equivalent data item is added and proposed to the user.

In order to achieve the fifth object of the present invention, there is provided a method of software standardization characterized in that information on equivalent data items of an existing software is inputted and added to the information on equivalent data items obtained by the above-mentioned method, so that information on equivalent data items for which the name and attribute of a standard data item are to be determined is prepared and/or accumulated.

In order to achieve a sixth object of the present invention, there is provided a method of software standardization characterized in that the name and attribute of a data item to be used as a standard are determined in advance, and the equivalent data items in an existing software are replaced by the name and attribute of a corresponding standard data item for each of the equivalent data items detected by the method described above.

In order to achieve the seventh object of the present invention, there is provided a method of software standardization characterized in that data item information in an existing program is analyzed, extracted and corrected as required thereby to prepare the name and attribute of a data item to be used as a standard.

In order to achieve the eighth object of the present invention, there is provided a method of checking software standardization characterized in that an object software is analyzed and equivalent data items are detected by the method described above, so that the mass of equivalent data items thus obtained are collated with the name and attribute of a standard data item thereby to produce the result of checking the matching.

As regards the first object described above, in detecting a mass of equivalent data items, information on data definition is analyzed to calculate physical relative positions of the data items, so that another data item sharing the same physical position or having the transfer relationship with the particular data item is detected and included in a mass of equivalent data items, thereby making it possible to reduce the omission of detection of equivalent data items and thus to improve the efficiency of the work of standardizing the names and attributes of data items in an existing software.

Also, still another data item sharing the same physical position as the above-mentioned another data item having a data transfer relationship is detected by calculation of physical relative positions of data items and included in the mass of equivalent data items, thereby making it possible to reduce the omission of detection of equivalent data items and thus to improve the efficiency of the work of standardizing the names and attributes of data items in an existing software.

Further, the relationship in physical position and length between an original data item and another data item sharing the same physical position is compared with the relationship in physical position and length between another data item having a data transfer relationship with the another data item and still another data item sharing the same physical position with the another data item, so that corresponding still other data items having no data transfer relationship with the original data item are detected and excluded to prepare a mass of equivalent data items. In this way, the possibility of erroneous detection of an equivalent data item is capable of being reduced thereby to improve the efficiency of the work of standardizing the names and attributes of data items in an existing software.

Furthermore, the physically identical files defined in different programs are detected, and the data items belonging to the particular files and sharing the same physical position are detected and included in the mass of equivalent data items, thereby making it possible to reduce the omission of detection of equivalent data items and thus to improve the efficiency of the work of standardizing the names and attributes of data items in an existing software.

As regards the second object, in detecting a candidate of equivalent data item by detection of a data transfer relationship, a case in which data are transferred from a plurality of data items to a given data item is detected, in which case information indicating a low possibility of being an equivalent data item is proposed to the user, whereby an erroneous decision on an equivalent data item for conversion into the same name and attribute is reduced, thereby improving the efficiency of the work of standardizing the names and attributes of data items in an existing software.

As regards the third object, names of data items are compared to detect data items having analogous names as candidates of equivalent data items, whereby the omission of detection of an equivalent data item is reduced, thereby improving the efficiency of the work of standardizing the names and attributes of data items in an existing software.

As regards the fourth object, in proposing candidates of data items which should have the same name and attribute as the equivalent data items described above, different priority levels are attached to the data items by the method of detecting the candidates of equivalent data items and proposed to the user, whereby an erroneous decision on an equivalent data item for conversion into the same name and attribute is reduced, thereby improving the efficiency of the work of standardizing the names and attributes of data items in an existing software.

As regards the fifth object, information on equivalent data items of an existing software is inputted and added to the information on equivalent data items obtained by the method mentioned above, so that information on equivalent data items providing an object of determining the name and attribute of a standard data is prepared and/or accumulated, whereby information on equivalent data items obtained by analysis of a part of the program of an existing software is accumulated to prepare information on equivalent data items combined with that obtained by analysis of another part of the program, which is used as a base for determining the name and attribute of a standard data item. As a result, in the case of a software large in scale, the object may be divided for effecting the work of detecting equivalent data, thereby improving the efficiency of the work of standardizing the names and attributes of data items in an existing software.

As regards the sixth object, the name and attribute of a data item to be used as a standard are determined in advance, and the equivalent data items in an existing software are replaced by the name and attribute of the standard data item for each mass of equivalent data items detected by the method mentioned above, whereby it is possible to determine the name and attribute of a data item used as a standard in advance and to detect and replace the data items in an existing software requiring replacement by the standard data item, thereby making it possible to reduce the possibility of making an error in determining the name and attribute of the standard data item and thus to improve the efficiency of the work of standardizing the names and attributes of the data in an existing software.

As regards the seventh object, the information on data items in an existing program are analyzed and automatically extracted, which information is corrected as required to prepare the name and attribute of a data item used as a standard, whereby the number of steps for determining the name and attribute of a standard data is reduced thereby to improve the efficiency of the work of standardizing the names and attributes of data items in an existing software.

As regards the eighth object, an object software is analyzed, an equivalent data item obtained by the method mentioned above is detected, a mass of equivalent data items thus obtained is collated with the name and attribute of the standard data item, and the result of checking the matching is outputted, whereby the work of confirming the correct setting of the name of a data item is facilitated, thereby improving the efficiency of the work of standardizing the names and attributes of data items in an existing software.

BRIEF DESCRIPTION OF THE DRAWINGS

FIGS. 3A, 3B, 3C, and 3D are diagrams for explaining the role played by a job control program.

FIG. 4 is a diagram showing an example of analysis information of a job control program.

FIG. 5 is a diagram showing an example of equivalent data detection information for a file.

FIGS. 6 and 10 are diagrams showing an example of a definition part of a source program described in the COBOL language.

FIGS. 7 and 16 are diagrams showing an example of a procedure part of a source program described in the COBOL language.

FIGS. 8 and 11 are diagrams showing an example of analysis information of a data definition part.

FIGS. 9, 27 and 30 are diagrams showing an example of equivalent data item information.

FIG. 12 is a diagram showing an example of equivalent data item information displayed on a display unit.

FIG. 13 is a diagram showing an example of equivalent data item information already determined.

FIG. 14 is a diagram showing an example of the COBOL language program changed to a standard data.

FIGS. 17 and 18 are diagrams showing an example of equivalent data information.

FIG. 19 is a diagram showing an example of a display and designation screen for equivalent data according to the embodiment

FIG. 21 is a diagram showing an example of equivalent data detection information for a file.

FIG. 22 is a diagram showing an example of a list of equivalent data information.

FIG. 24 is a diagram showing a correspondence of standard data according to the embodiment.

FIG. 26 is a diagram showing a registration table for standard data representing the correspondence relationship between standard data and file set or the like.

FIG. 29 is a diagram showing a screen for standard data selection.

FIG. 31 is a diagram showing a correspondence table of standard data.

FIG. 33 is a diagram showing a table of checking the matching.

DESCRIPTION OF THE PREFERRED EMBODIMENTS

An embodiment of the present invention will be described in detail below with reference to the accompanying drawings.

Figure 1:
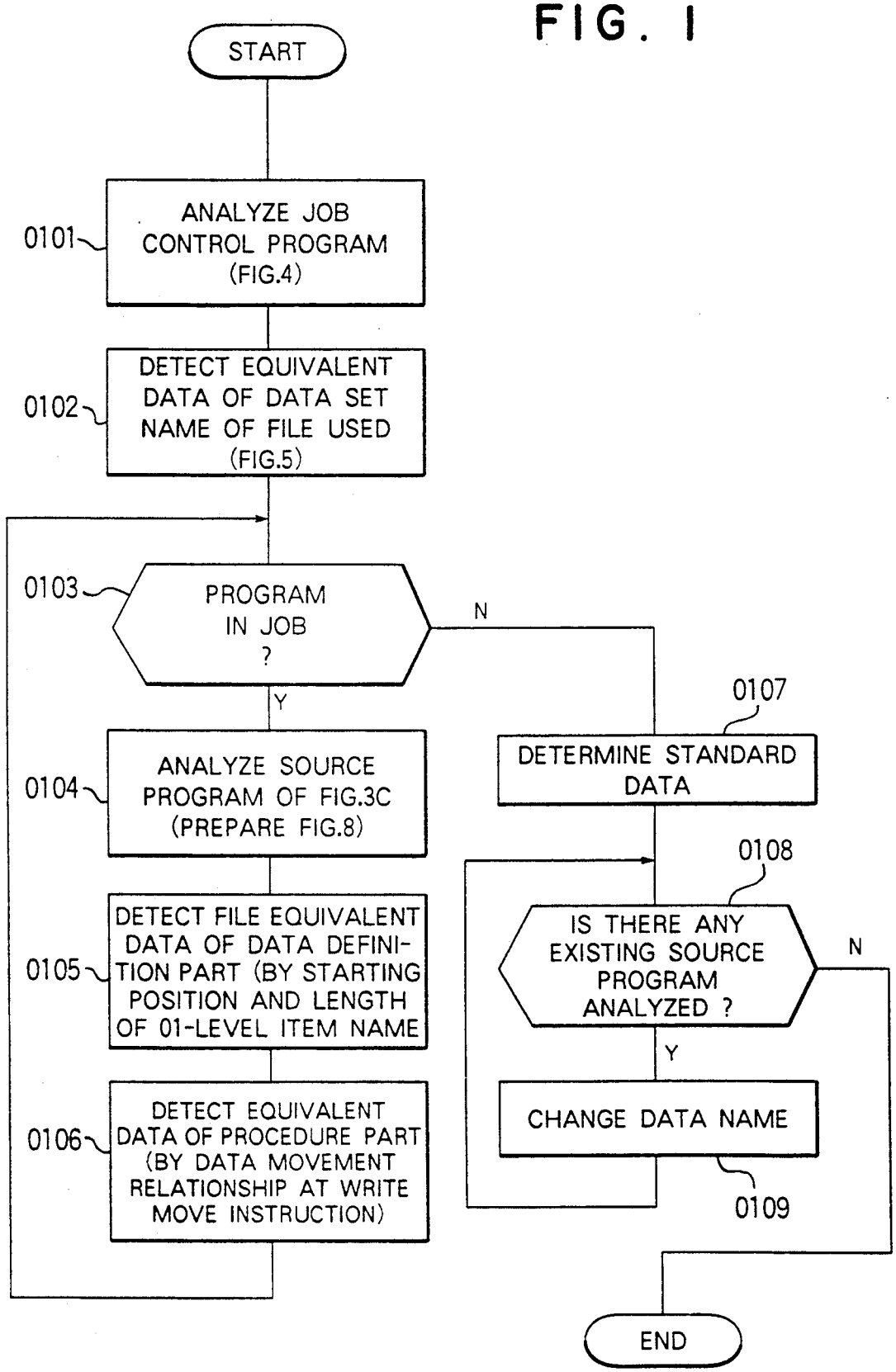
FIG. 1 is a diagram showing steps of processing according to a first embodiment of the present invention.
Figure 2:
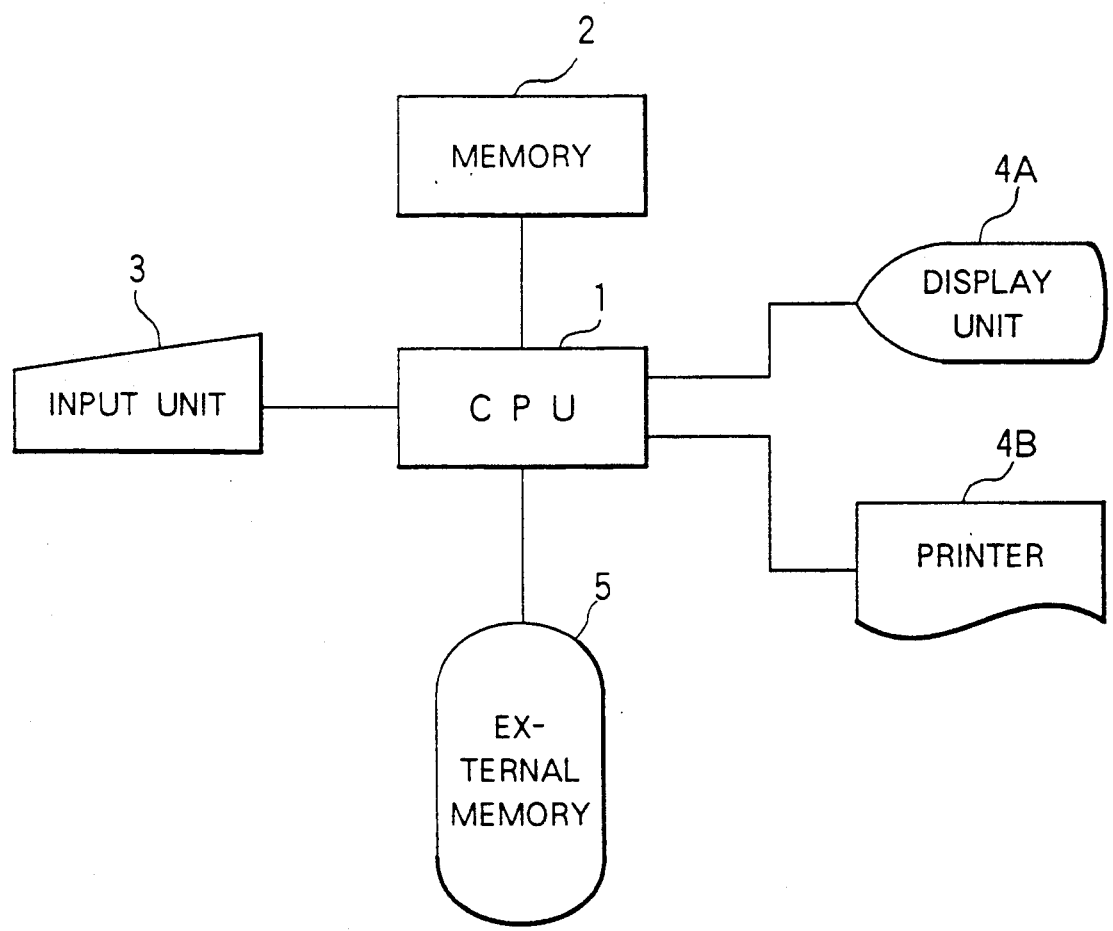
FIG. 2 is a diagram showing a hardware environment of the embodiment.

Steps of processing according to a first embodiment of the present invention are shown in FIG. 1, and a hardware environment according to the same embodiment in FIG. 2. In FIG. 2, reference numeral 1 designates a CPU for controlling the whole system, numeral 2 a memory necessary for operating the CPU, numeral 3 an input unit operated by the operator, numerals 4A and 4B a display unit and a printer respectively as output units, and numeral 5 an external memory unit for holding various data.

A method of program standardization according to this embodiment will be explained with reference to FIG. 1. First, a job control program describing information on files used for execution and the sequence of execution of a program used for standardization is inputted and analyzed (step 0101).

FIGS. 3A to 3D are diagrams for explaining the role of the above-mentioned job control program. The job control program 0301 shown in FIG. 3A, for instance, provides a job control specification 0302 shown in FIG. 3B programmed as required, and describes the sequence of program execution and file information. The source program AA0303 of FIG. 3C and the source program "BB"0304 of FIG. 3D represent the source programs described in the COBOL language for the execution programs "AA"0305 and "BB"0306 respectively. Although the explanation that follows uses the COBOL language, it is possible alternately to use other processing languages such as PL/I. A job control program is prepared by the use of a language installed for the system and is inputted into the system for control at the time of execution of batch processing of the program.

In the explanation, the program name "AA"0307 corresponds to the source program "AA"0303 and the program name "AA"0308, and indicates that the source program "AA"0303 is the one involved. The name "FILE A"0309, on the other hand, corresponds to the DD-name "FILE A"0310 described in the source program "AA"0303, and leads to the file name "FILE 1"0311. The detailed definition part 0312 of this file name "FILE 1"0311 leads to a corresponding record name "AA-REC". The data set name "FILE 1.DATA"0313, on the other hand, indicates the name attached to the data set accumulated in an external memory unit used at the time of program execution. As a result, it is possible to specify a file set, the file in the program and a corresponding record definition at the time of program execution.

FIG. 4 is a diagram showing an example of information obtained as a result of analysis of the job control program showing illustratively in FIG. 3A. It is analyzed that the program name "AA" indicates that the corresponding "FILE 1.DATA"0313 is being used, so that the program name "AA"0401, "FILE A" 0402 and "FILE 1.DATA"0403 in FIG. 4 are stored in memory.

Then, an equivalent data is detected between the files used, at step 0102 shown in FIG. 1 on the basis of the result of job control program analysis.

FIG. 5 is a diagram showing an example of information on equivalent data detection between files. That the two file sets 0406 and 0409 representing the result of analysis of the job control program shown in FIG. 4 is indicative of the fact that the same value of the file set accumulated in the external memory unit is used and also that the same data is referred to in relation to a plurality of names having the same data set name. The DD name "FILE B"0405 shown in FIG. 4, for example, has the same value as "FILE C"0408 having the same data set name "FILE 2.DATA"0409 as "FILE 2.DATA"0406 defined to be assigned thereto. Therefore, the program names in FIG. 4 are stored in memory with the equivalent value 0501 attached thereto for the program names "AA"0502, "BB"0504 shown in FIG. 5 and corresponding DD-names "FILE B"0503, "FILE C"0505 respectively.

As the next process, in accordance with the program name obtained at the job control program analysis (step 0101) shown in FIG. 1, the source program corresponding to each program (step 0103) included in the job control program is analyzed (step 0104), followed by detection of equivalent data in the data definition part, the detection of equivalent data in the procedure part (step 0106) and the storage of equivalent data information in the memory.

The COBOL language, as well known, has four divisions including an identification division, an environment division, a data division and a procedure division. The data definition part is located bridging over the environment and data divisions.

FIG. 6 shows an example of the data definition part in the source program described in the COBOL language, FIG. 7 is a diagram showing an example of the procedure part of the source program described in the COBOL language, and FIG. 8 an example of information on data definition part analysis with the result of analysis for the data definition part stored in the memory.

In the analysis of an existing source program for the data definition part shown in FIG. 1, step 0104 arranges the definition of each data item at 01 level itemwise. As to each item of 02 and subsequent levels associated therewith, the relative starting position of each item with the starting position of an area occupied by the 01-level item on the memory as unity or base, together with the file assignment name indicating the record for input/output to the file as well as the length of the area occupied on the memory, are extracted and stored in the memory as data definition part analysis information.

The item definition 0601 for data description shown by item "WARE-CODE" in FIG. 6, for instance, is the one included in the item definition 0602 of the 01-level item name "AA-REC", so that the starting position "4" and the length "5" of the item "WARE-CODE" with the item "AA-REC"0602 as the starting position "1" are prepared as analysis information. Specifically, with regard to the analysis information of the item "WARE-CODE"0601, the program name "AA" for the particular item, the 01-level item name "AA-REC" for the same item, the item name "WARE-CODE", the starting position "4" and the length "5" of the item and the information "FILE A" indicating the file assignment name are stored in the memory as an item 0801 of the data definition part analysis information shown in FIG. 8.

In the analysis of the procedure part of the source program shown in FIG. 7, the item in use is extracted together with an instruction word with an instruction statement as a unit.

In the next process, the equivalent data detection step 0105 of the data definition part shown in FIG. 1 is executed. As described below, among the items of the data definition part analysis information having the file assignment name information and the program name having the same equivalence number in the file equivalent data detection information, those items having the same starting position and length are stored in memory as the equivalent data information. An example of this procedure will be explained with the steps for the next program to be analyzed.

In the next process, the equivalent data detection (step 0106) of the procedure part shown in FIG. 1 is executed.

In the example shown in FIG. 7, an output instruction statement "WRITE"0701 for output to an external file is detected, and the output record name "BB-REC"0702 is extracted. Then, an item having the output record name "BB-REC" in the 01-level item name, such as the item 0802 of the item name "SLIP-NO" shown in the example of FIG. 8 is detected from the statement information in the procedure part of FIG. 7 as a moving instruction statement having an item name on the right side or the receiving side. In the example shown in FIG. 7, this corresponds to the statement 0703, so that the item shown by the item name "SLIP-NO" and the two item information (0802 and 0803 in the example of FIG. 8) in the data definition part analysis information for the item indicated on the left side or in the source or sending-side item name "SALES-SLIP" are stored in the memory as equivalent data information having the mutually same equivalent number (0901 in the example of FIG. 9). The starting position and the length shown in the example of FIG. 9 becomes effective only in the case where a corresponding item utilizes only a part of the area occupied in the memory. When the data in the column of the two data set names of the equivalent data 0901 in FIG. 9 is not blank, it represents information indicating the existence of the DD-name of each item shown by the example of FIG. 8. If this column is space, on the other hand, it indicates that a corresponding DD-name is not present. In view of the fact that the data set name of the item 0901 shown by the example of FIG. 9 for the item name "SALES-SLIP" providing the sending-side item is "other than blank", the detection of the equivalent data for the particular item is completed, and the equivalent data is detected for other items included in the record BB-REC. For example, a moving instruction statement having the item 0804 indicated by the item name "SALES-DAY" in the example of FIG. 8 as a receiving-side item name is detected from the statement information of the procedure part. This corresponds to the statement 0704 in the example of FIG. 7, so that the items indicated by the item names "SALES-DAY" and "DAY-S" are stored in the memory as the equivalent data information having the same equivalent number (3) (0902 in FIG. 9).

The DD-name of the item information of the item name "DAY-S" shown in the example of FIG. 8 is blank indicative of the fact that it is not an input/output item, and therefore a moving instruction statement with the particular item name as a receiving-side item name is detected from the procedure part statement information. In the example of FIG. 7, the corresponding moving instruction statement is incapable of being detected, and therefore the next step is to detect from the data definition analysis information of FIG. 8 the item name "SALES-DATE" having the same 01 level as the particular item, starting position "3" and length "2". In the example of FIG. 8, the corresponding information is the item information 0806 designated by the item name "DAT-X" which is stored in the memory as the equivalent data information (0903 in FIG. 9) having attached thereto the same equivalence number "3" as the item name "DAY-S" mentioned above, while at the same time detecting a moving instruction statement with the particular item name HI-X as a receiving-side item name from the procedure part statement information. In the example of FIG. 7, a corresponding moving instruction statement is incapable of being detected. Therefore, among the items having the same 01-level item name "SALES-DATE" as the particular item name "JI-X", an item having an area sharing or including the area indicated by the starting position "3" or the length "2" of the particular item is detected from the data definition part analysis information shown in FIG. 8. In the example of FIG. 8, this corresponds to the item information 0807 indicated by the item name "SALES-DATE", so that the same equivalence number "3" as the item of the above-mentioned item name "DAY-X" is attached to the step 0904 in FIG. 9 (See FIG. 9). Thus, the starting position "3" and the length "2" of the item "HI-X" used as a key for detection are stored in the particular position and length columns of the memory as the equivalent data information (0904 of FIG. 9), while at the same time detecting the moving instruction statement 0705 from the procedure part statement information with the item "SALES-DATE" as a receiving-side item name.

This corresponds to the statement 9705 in the example shown in FIG. 7, so that the item information (0808 of FIG 8) in the data definition part analysis information of the item indicated by the sending-side item name "TRANSACTION-DATE", with the same equivalence number "3", the position "3" and the length "2" as the item indicated by the receiving-side item name "TRANSACTION-DATE" attached thereto, is stored in the memory a the equivalent data information (0905 of FIG. 9).

In the next process, a moving instruction statement with an item indicated by the item name "TRANSACTION-DATE" as a receiving side is detected from the procedure part statement information. In the example of FIG. 7, for lack of the moving instruction statement concerned, items other than those in the data definition part analysis information having the same 01-level item name "TRANSACTION-DATE" as the particular item which have an area sharing or including the area of the particular item are detected. In the case of FIG. 8, for lack of a corresponding item, an item having an are sharing or including an area indicated by the position "3" and the length "2" in the equivalent data information 0905 shown in the example of FIG. 9 among the items in the data definition part analysis information having a 01-level item name "TRANSACTION-DATE" is detected from the data definition part analysis information. In the example of FIG. 8, on the other hand, the corresponding item is the item information 0809 indicated by the item name "DAY-T", so that the same equivalence number "3" as the equivalent data information 0905 in FIG. 9 is attached thereto, and the information of the item indicated by the detected item name "DAY-T" is stored in the memory unit as the equivalent data information 0906.

In the next process, the particular item indicated by the detected item name "DAY-T" is detected by the method mentioned above, so that the equivalent data associated therewith is obtained and stored in the memory as the equivalent data information. In the example shown in FIG. 7, the statement 0706 is involved, and in the example of FIG. 9, the equivalent data information 0907 is relevant.

For all the output record items, the equivalent data information is stored in the memory by the method mentioned above, thereby completing the equivalent data detection for a given existing source program, followed by the analysis and equivalent data detection for the next existing source program.

In the case where a data operation instruction statement with a particular item as a receiving-side item is detected during the detection of the equivalent data, the particular item is not stored in the memory as a equivalent data.

FIG. 10 shows an example of another source program described in the COBOL language, and FIG. 11 an example of the data definition part analysis information.

The analysis of the existing source program shown in the example of FIG. 1 is conducted (step 0104) while holding the data stored in the memory with regard to the data definition part analysis information (1101 in FIG. 11) having the DD-name "FILE B"0503 associated with the program name "AA"0502 that has been already subjected to program analysis as shown in FIG. 5, for example. As a result of analysis of the source program shown in FIG. 10, the data definition part analysis information assumes a form shown in 1102 of FIG. 11 in the same manner as in the embodiment described with reference to FIGS. 6 and 8.

As the next process, in the step 0105 for equivalent data detection of the data definition part in the example shown in FIG. 1, equivalent data based on the coincidence of the starting position and length are detected in the data definition part analysis information having respective DD-names from the corresponding DD-names of the equivalent data information of the files. The equivalent data information of the files having the equivalence number "1"0501 in the case of FIG. 5, for example, are the DD-name "FILE B"0503 of the program name "AA"0502 and the DD-name "FILE C"0505 of the program name "BB"0504.

The record information having the corresponding DD-name and program name of the data definition part analysis information shown in FIG. 11 are 1101 and 1102 respectively, so that the items having the same starting position and length among the record information are detected and stored as equivalent data information in memory. In the process, in the case where any of the equivalent data information detected is already stored in memory as equivalent data information, only the unstored equivalent data information, with the equivalence number of the already-stored equivalent data information attached thereto, are stored in memory. The information 1103 of the item name "SLIP-NO" and the information 1104 of the item name "SLIP-NUM" shown in the example of FIG. 11, for instance, are the equivalent data having the same starting position "1" and length "3", and are stored in the memory as equivalent data information. The item of the item name "SLIP-NO", however, is already stored in the memory as 0901 in the form of equivalent data information shown in the example of FIG. 9, and therefore, is stored in the memory (0908) with the same equivalent number "1" attached thereto. With regard to other items of the data definition part analysis information, equivalent data are also stored in the memory by similar procedure. The detection of equivalent data of the procedure part shown in the example of FIG. 1 (step 0106) was already explained.

Upon completion of the program processing (steps 0104, 0105 and 0106 in FIG. 1) in the job from the analysis information of the job control program, a standard data is determined on the basis of the equivalent data item information (step 0107).

The standard data is determined by indicating on a display unit a plurality of items having the same equivalence number for which the data set name is "other than blank" in the equivalent data item information and also by inputting the number of the item name used as a standard or the standard data name determined by the user from the input unit.

FIG. 12 is a diagram showing an example of the equivalent data item information displayed on the display unit, and FIG. 13 an example of the equivalent data item information already determined.

Among the equivalent data item information shown in the example of FIG. 9, for instance, items (0901, 0908) having an equivalence number "1" and a data set name other than blank are displayed as shown in the example of FIG. 12 with an item number attached to the display unit, so that a standard data name determined, together with the information of the item name having the same equivalence number corresponding to the item number inputted by the user from the input unit or the item name inputted by the user as a standard data, are stored in the memory shown in the example of FIG. 13 (1301).

In the next process, with regard to the existing source program already analyzed and stored in memory as shown in the example of FIG. 1 (step 0108), the input-/output items with the DD-name other than blank are repeatedly changed to the standard data name already determined (step 0109).

FIG. 14 shows an example of the COBOL language program including the processing for changing to a standard data. The example shown in FIG. 14 is such that the program described in the COBOL language shown in FIGS. 10 and 11 is changed by changing, for example, the item name "SLIP-NO"1032 to the standard data name "SALES-SLIP-NO"1303 on the basis of the correspondence relationship of the standard data names stored in the memory shown in the example of FIG. 13 and is generated in the form of statement in the COBOL language (1401).

According to the present embodiment, the equivalent data used over programs is capable of being captured even while moving between items having the inclusive relationship in the program, thereby eliminating the omission at the time of determining a standard data name. At the same time, repercussion to the data item not equivalent in terms of inclusive relationship is dampened, so that the work of determining a standard data name by the user is saved, thereby making it possible to generate a program requiring reproduction in the standardization of an item name within an existing program by the standard data name for an improved maintenability.

Figure 15:
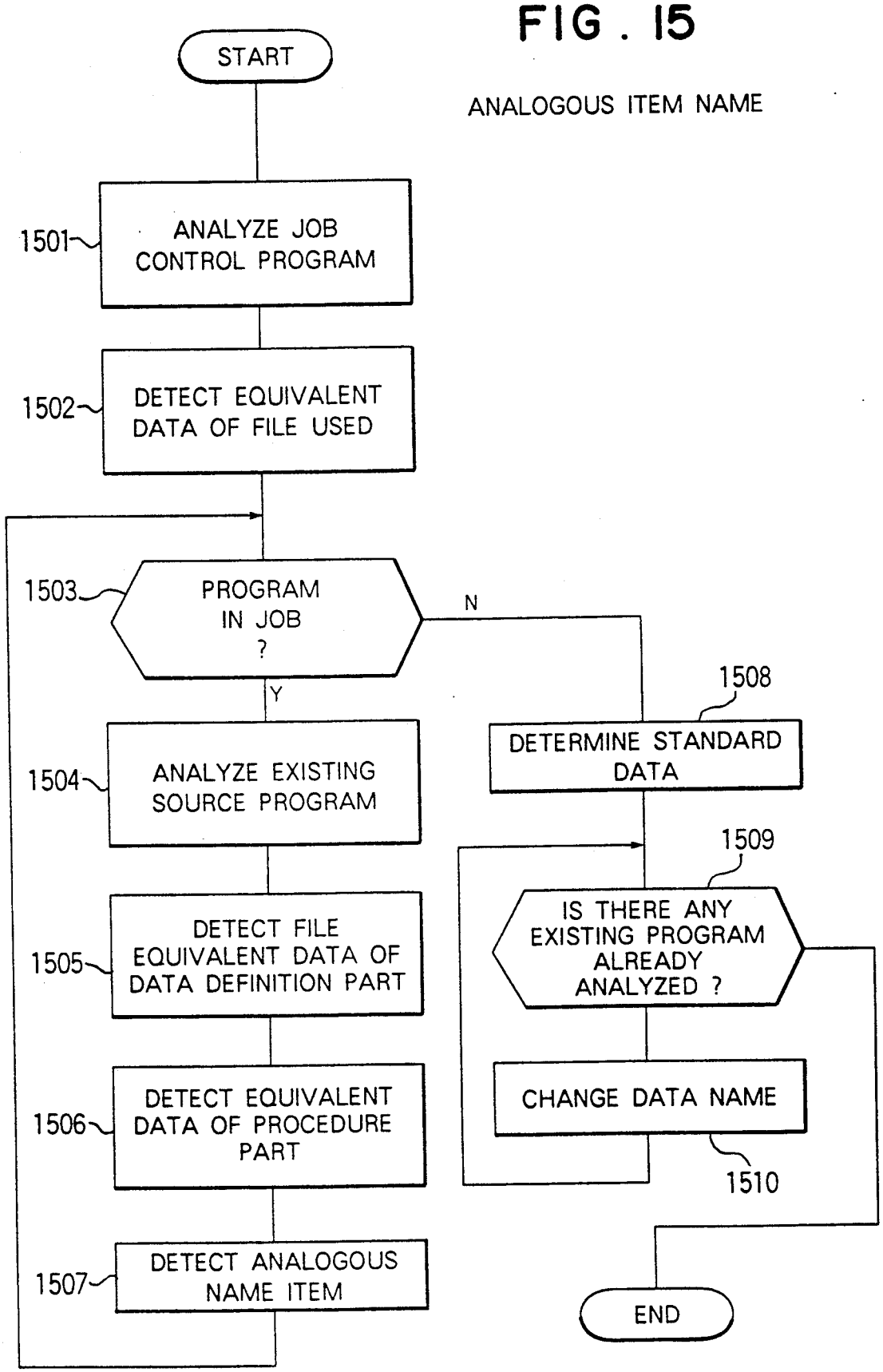
FIG. 15 is a diagram showing steps of processing according to a second embodiment.

The steps of processing according to a second embodiment of the present invention are shown in FIG. 15. According to this embodiment, in addition to the processing steps of the first embodiment shown in FIG. 1, the detection of the item having an item name analogous to the equivalent data item name (step 1507) and the processing of the item for receiving the substitution from a plurality of items are executed. The other steps in the example shown in FIG. 15 are identical to those shown in FIG. 1 respectively.

In the detection of equivalent data in the procedure party (step 1506) according to this embodiment, an "equivalence level" is added to the equivalent data information of the embodiment shown in the example of FIG. 1, whereby each of the equivalence levels of a plurality of sending-side items extracted from at least one moving instruction statement with an item name requiring analysis of an equivalent data as a receiving-side item is set to a value different from the equivalence level of the receiving-side item name as described below, thereby indicating the suspicion that the data involved is not equivalent.

Figure 16:
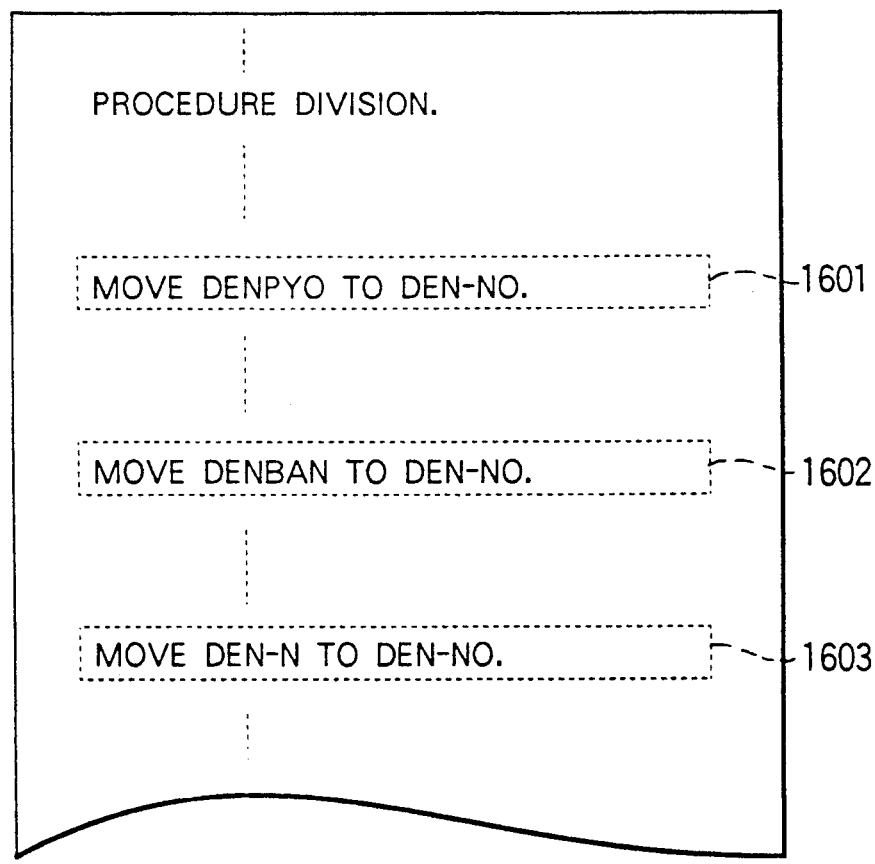

FIG. 16 shows an example of the procedure described in the COBOL language, and FIGS. 17 and 18 an example of the equivalent data information stored in the memory.

First, the statement 1601, for example, shown in the case of FIG. 16 providing a moving instruction statement with the item name "DEN-NO" as a receiving-side item name is stored in memory as an equivalent data information 1701 shown in the example of FIG. 17. In the process, the equivalence level 1702 is set to "1" identical to the equivalent number, for example. In the next process, the statement 1602 shown in the example of FIG. 16 providing a moving instruction statement with the item name "DEN-NO" similar to the one mentioned above as a receiving-side item name is detected. An attempt to store this as equivalent data information in the memory in the same manner as in the aforementioned operation fails due to the fact that as shown in the example of FIG. 17, the item name "DEN-NO"1701 is already stored. Then, of all the items having the equivalent number "1" and an equivalence level equal to or larger than the equivalence level "1" other than the items of the item name "DEN-NO", the item 1703 having the largest equivalence level is detected. In the case where the equivalence level "1" of the particular item is identical to the equivalence level detected, "1" is added to the equivalence level so that the equivalence level is changed to "2". At the same time, the item information of the item name "DENBAN" of the statement 1602 shown in the example of FIG. 16 is stored in the memory as the equivalence level "2" (1801 shown in the example of FIG. 18).

Further, in the case where a moving instruction statement with the item name "DEN-NO" as a receiving-side item name is detected (statement 1603), the item of the sending-side item name "DEN-N" having the equivalence level "2" larger than the equivalence level "1" of the particular item of the receiving-side item name "DEN-NO" is detected (1801 in FIG. 18). The equivalence level "2" of the detected item is different from the equivalence level "1" of the particular item, and therefore the item information of the above-mentioned sending-side item name "DEN-N" is stored in memory as the equivalent data information having the equivalence level "2" (1802 in FIG. 18).

In the example of FIG. 15, the processing of detecting an analogous name item shown in the step 1507 is performed in such a manner that item information having an analogous item name as item names in the equivalent data information stored in the memory is detected from the data definition analysis information stored in the memory, and an equivalence level having an equivalence number of the equivalent data information providing a key of detection is stored in memory as equivalent data information as distinguished from the other equivalent data information as blank, for example. In the case of 1801 shown in the example of FIG. 18, for instance, in view of the fact that three successive characters are identical in the item name of the equivalent data information indicated by the equivalence number "1", the equivalence level is stored in the memory as the equivalent data information. The five names in the item name column in FIG. 18 represent words partially analogous to the Japanese language "DENPYO BANGO" corresponding to the slip number.

The determination of standard data shown in the example of FIG. 15 according to the present embodiment (step 1508) is such that the ability of displaying the equivalence level and the selection of an item used as a standard data are added to the equivalent data information displayed on the display unit in the embodiment of FIG. 1. An example of the display designation screen of the equivalent data information is shown in FIG. 19. 1901 designates an example of display of an equivalence level.

Thus, according to the present embodiment, even when a movement is received from a plurality of items, a standard data is capable of being selected and designated. Also, another name or a standard data name may be set by display of an analogous name item. In this way, the standardization of a data name may be effected in fine detail, thereby improving the maintenability of the reproduction program further from the embodiment shown in the example of FIG. 1.

Figure 20:
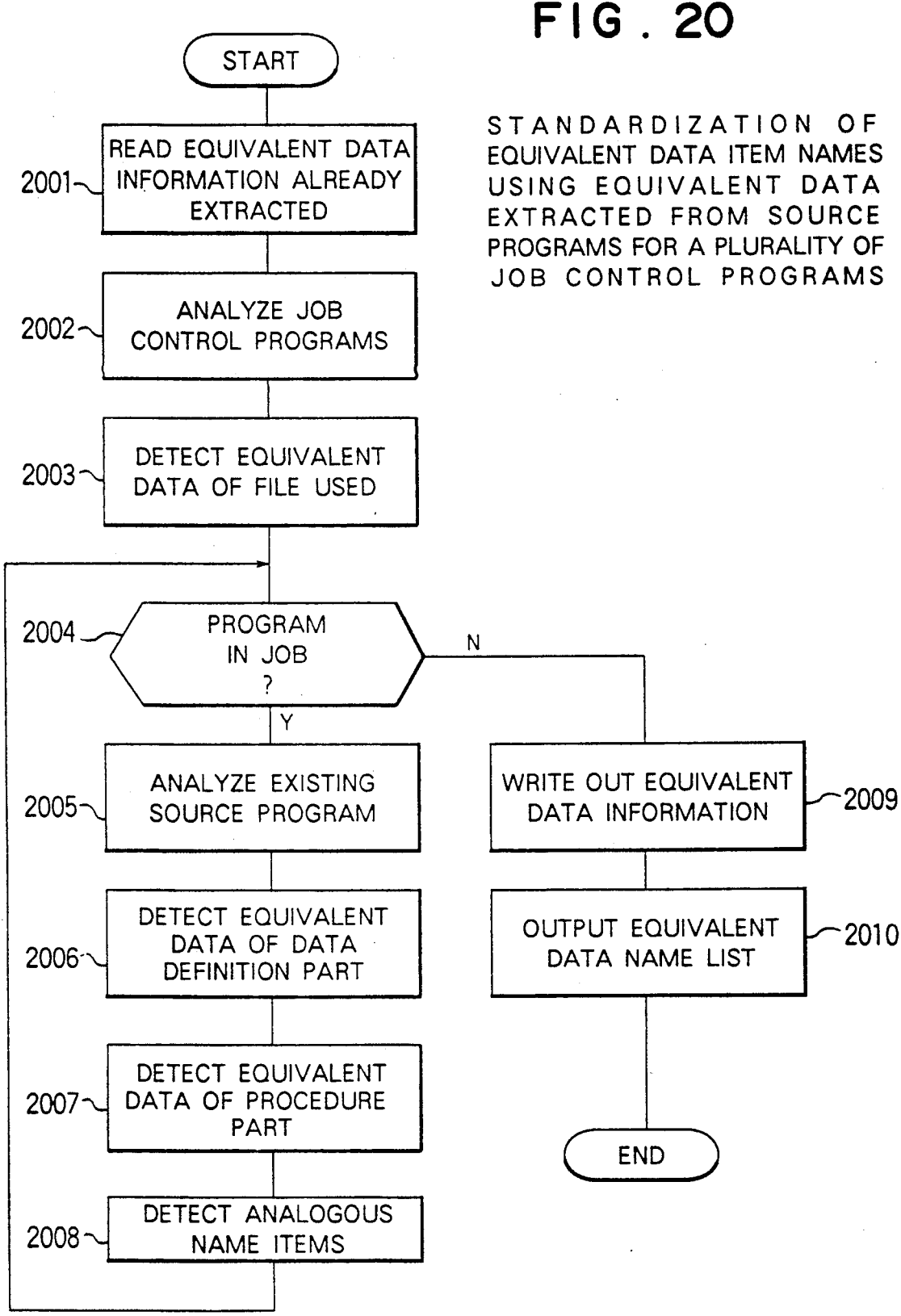
FIG. 20 is a diagram showing steps of processing according to a third embodiment.

FIG. 20 shows the steps of processing according to a third embodiment of the invention. In contrast with the embodiment shown in FIG. 15 in which the equivalent data item names in a series of programs described in a job control program are to be standardized, the equivalent data information extracted for each job control program is accumulated in an external memory unit in order to standardize the equivalent data item names for the whole system according to the present embodiment.

According to the embodiment shown in FIG. 20, the steps subsequent to the determination of a standard data (steps 1508, 1509, 1510) are replaced by an output of equivalent data list (step 2010), and steps 2001 and 2009 are added for input/output of equivalent data information with the external memory unit. This embodiment is the same as the one shown in FIG. 15 except that the step 2006 where even the file name is added to the equivalent data names to be standardized is changed.

The step 2001 for reading the equivalent data information already extracted as shown in FIG. 20 is such that according to a method shown in the present embodiment, the equivalent data information already extracted and accumulated in the external memory unit are read and stored into the memory for a job control program different from the one analyzed in the steps subsequent to the step 2001. In writing out the equivalent data information of the step 2009, conversely, the extracted equivalent data information are accumulated in the external memory unit.

The equivalent data detection step 2006 of the data definition part according to the present embodiment is such that the equivalent data detection for the internal file names is added to the equivalent data detection according to the embodiment shown in FIG. 1.

FIG. 21 is a diagram showing an example of the information on equivalent data detection of the file. An internal file name indicated by the program name and the file assignment name, for example, is added to the equivalent data detection information of the file prepared by the equivalent data detection step 2002 of the used file shown in the example of FIG. 20.

The equivalent data name list output step 2010 shown in the example of FIG. 20 is such that the equivalent data information extracted according to the present embodiment, for instance, is compiled and outputted to the output unit in the sequence of the equivalent data list of file names and item names.

According to the present embodiment, it is possible to standardize the equivalent data names of file names. Also, by accumulating the equivalent data in an external memory unit, the embodiment may be applied to other systems such as a data dictionary registration tool or the like, thereby extending the applications of the equivalent data information according to the present invention.

Figure 23:
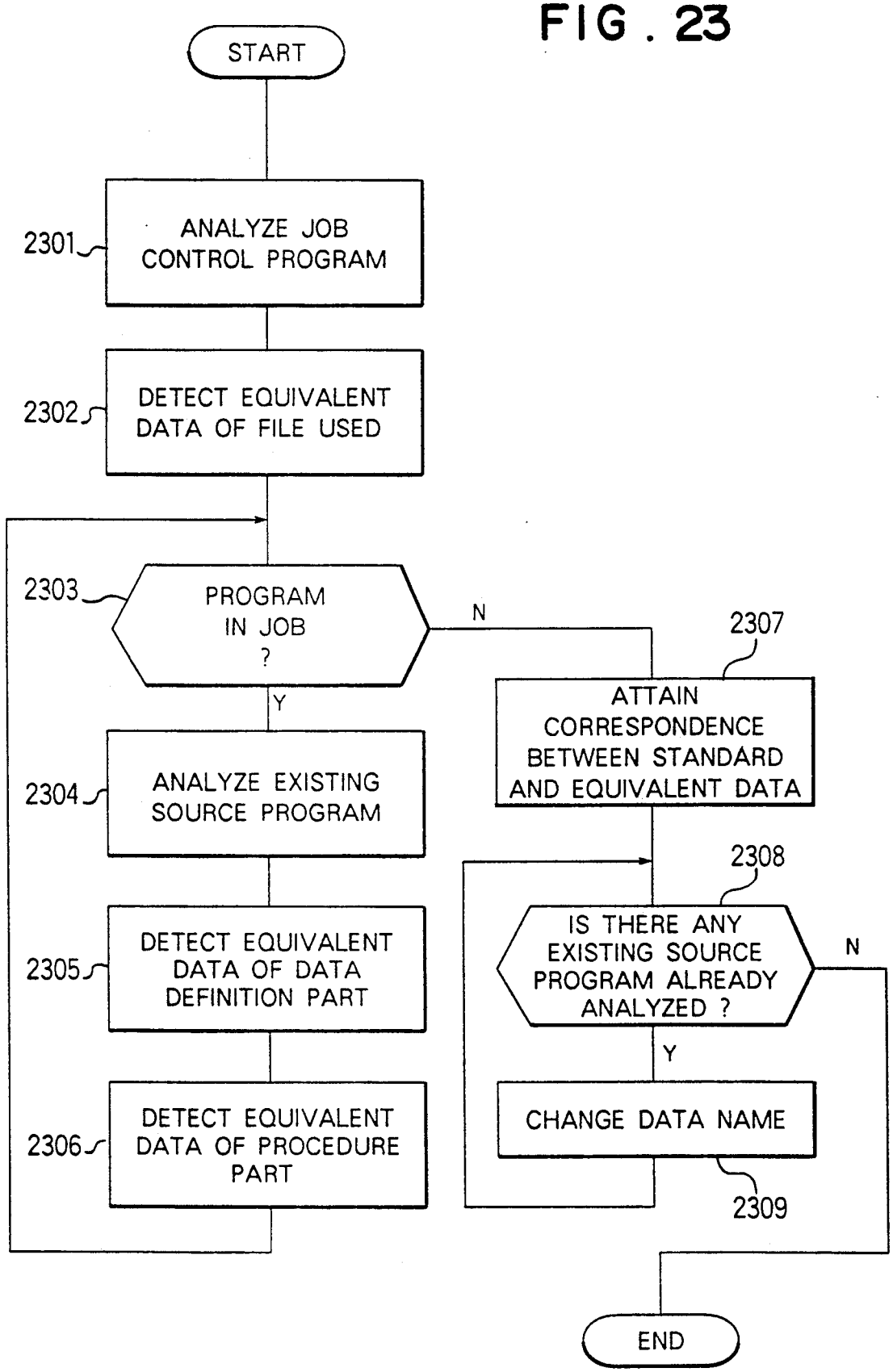
FIG. 23 is a diagram showing steps of processing according to a fourth embodiment.

FIG. 23 shows steps of processing according to a fourth embodiment of the present invention. According to this embodiment, a standard data is registered in a library in advance to reduce the work of designating the standard data by the user in the first embodiment. A method of program standardization according to this embodiment will be explained with reference to FIG. 23. The process from the job control program analysis step 301 to the equivalent data detection step 2306 for the procedure part is similar to that in the first embodiment. In the case of decision that there is no program in the job inputted (step 2303), the standard data in the standard data library accumulated in advance is collated with a mass of the equivalent data information decided to be equivalent as a result of analysis (step 2307), so that the data name is changed on the basis of the standard data correspondence table shown in FIG. 24 prepared by the collation (step 2309).

Figure 25:
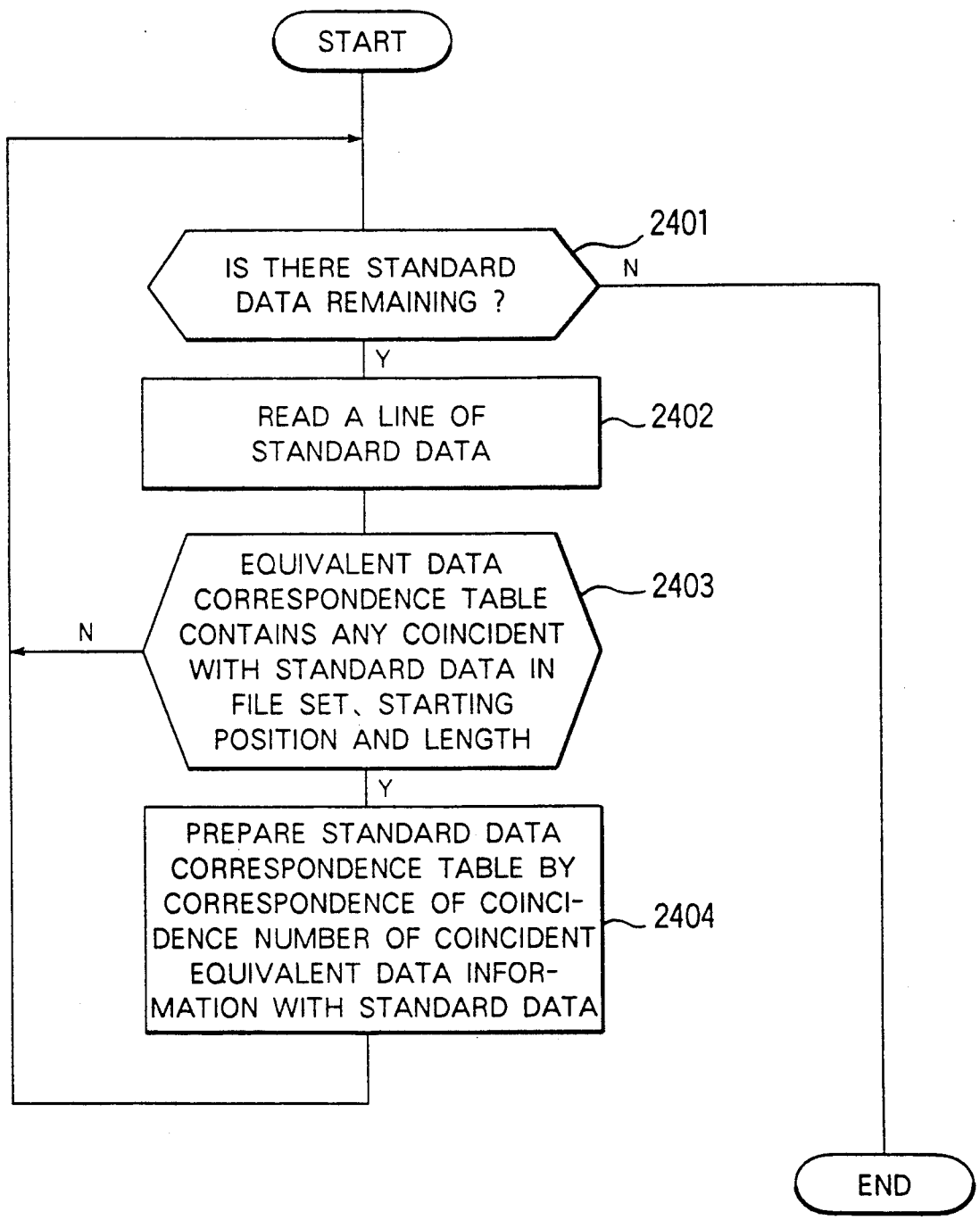
FIG. 25 is a diagram showing detailed steps of processing for collation of standard data according to the embodiment.

Now, the standard data collation step (2307) will be explained. FIG. 25 shows detailed processing steps of the standard data collation (step 2307), and FIG. 26 the correspondence between the name of standard data, file set, starting position and length. FIG. 27 is a diagram showing equivalent data item information similar to the one shown in FIG. 9, except that the 01-level item name, and the items of the position and length thereof specified in FIG. 9 are omitted, showing instead a starting position and length omitted in FIG. 9. In the process shown in FIG. 25, first, a line of standard data shown in FIG. 26 is read (step 2402), checking whether there is any one of the equivalent data information shown in FIG. 27 identical to the standard data in all of the factors including the file set, starting position and length (step 2403). If there is any identical equivalent information, a correspondence table shown in FIG. 24 is prepared from the equivalence number of the equivalent data information and the standard data.

The standard data name "SALES-SLIP-NO"(2501) in FIG. 26, for example, has a file set of FILE A (202) and the starting position of "1"(2503) and the length of "3"(2504). In contrast, the item name "SLIP-NO"(3101) in FIG. 27 has a file set of FILE (3104) with the starting position of "1"(3102) and the length of "3"(3103). Therefore, the standard data name "SALES-SLIP-NO" (2501) indicating the equivalence number including the SLIP-NO (3001) corresponds to all the equivalent data information of "1". Upon completion of this process, a new standard data is read again (step 2402). This process is repeated until it is decided that there is no standard data to be read (step 2401).

The standard data correspondence table of FIG. 24 shows the relationship of correspondence between standard data names and the equivalence numbers in FIG. 27. The "SALES-SLIP-NO" (2601), for example, corresponds to the equivalence number "1" (2602), and "GOODS" (2603) to the equivalence number "2" (2604). As a result, when the data name is changed in FIG. 23 (step 2309), the SLIP-NO (3101), SALES-SLIP (3105) and SLIP-NUM (3110) which are item names having a file set with the equivalence number "1" in FIG. 27 are converted to the standard name "SALES-SLIP-NO" (2601), and the item names having a file set with the equivalence number of "2" including GOODS (3106), WARE-CODE (3107) and GOODS-CODE (3111) into the standard name GOODS (2602).

FIG. 29 is a diagram showing steps of processing according to a fifth embodiment. According to this embodiment, there is provided a method of program standardization in which a mass of data items providing a standard data are selected in advance from data items of an existing source, and on the basis of this data, data names are collectively converted including subordinate data items. In the case where an existing source includes data having a tiered structure to be used as a standard data, the standard data may be designated more readily than in the first embodiment. In the steps of processing shown in FIG. 29, steps 0101 to 0106 are similar to corresponding ones in FIG. 1, although a standard data of the highest level is selected out of the existing data on a dialogue screen shown in FIG. 29 (step 2702).

Figure 28:
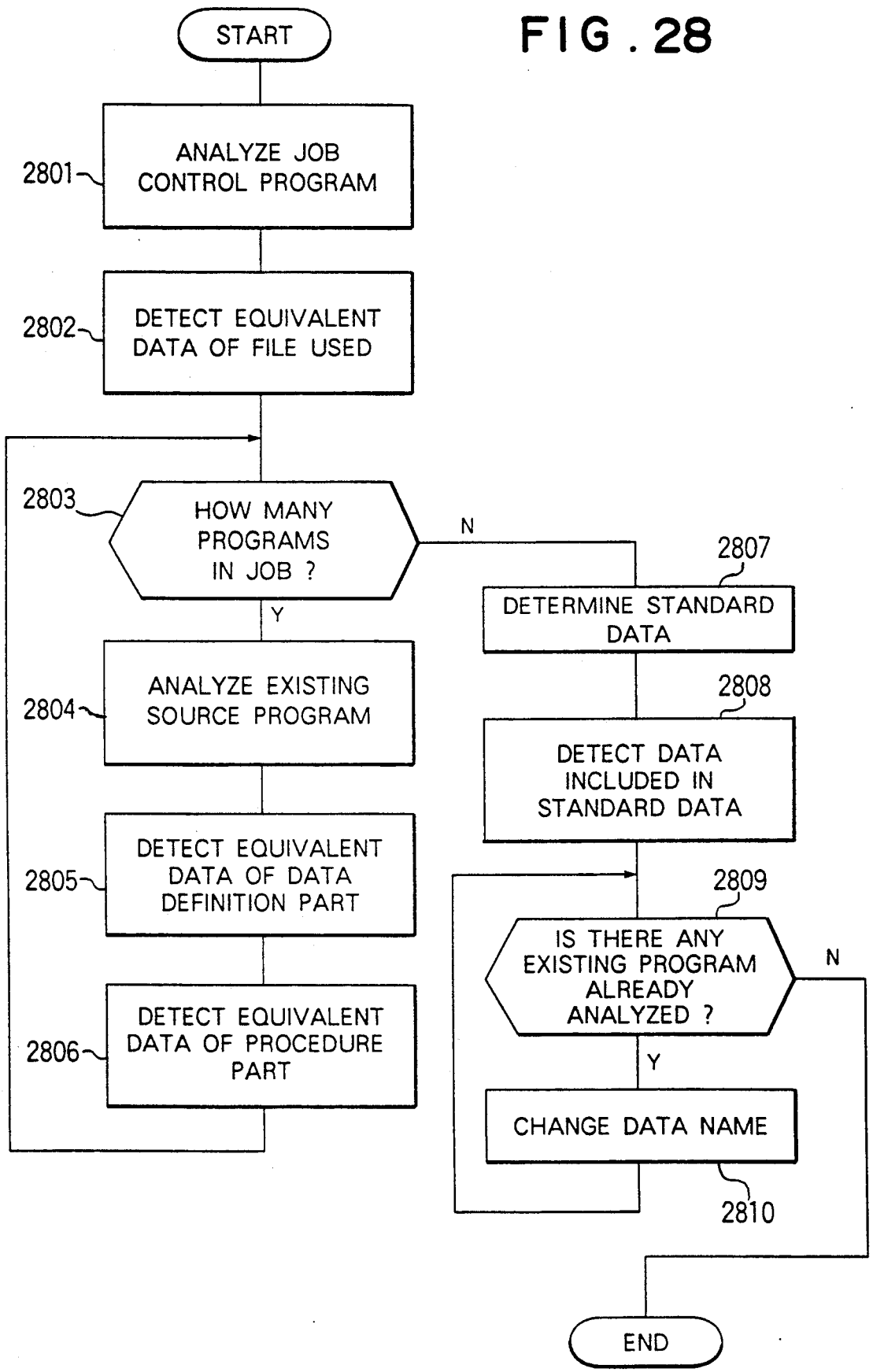
FIG. 28 is a diagram showing steps of processing according to a fifth embodiment.

When "TIME" (2701) is designated as a standard data of the highest level on the dialogue screen of FIG. 29, for example, an equivalent data correspondence table similar to that shown in FIGS. 9 and 27 is prepared. In FIG. 30, all the equivalent data information included in (subordinate to) "TIME" (3302) make up standard data. The 01-level item name of "TIME" (3302) in FIG. 30 is M-REC (3301), the starting position "5" (3303) and the length "6" (3304). Therefore, the 01-level item names with the M-REC in the range from "5" to "11", that is to say, "HOUR" (3305) with the starting position "5" and length "2", "MINUTE" (3306) with the starting position "7" and length "2" and "SECOND" (3307) with the starting position "9" and length "2" make up equivalent data information included in "TIME". The corresponding equivalence numbers 3, 4, 5 and 6 are detected from the equivalent data correspondence table of FIG. 30 for each of the data names "TIME", "HOUR", "MINUTE" and "SECOND" respectively used as a standard thus obtained to prepare a standard data correspondence table as shown in FIG. 31. The processing steps 2809 and 2810 shown in FIG. 28 are similar to the correspondings one in FIG. 15. As an alternative, subsequent steps may be executed after manually correcting the standard data names in the standard data correspondence table of FIG. 31.

Figure 32:
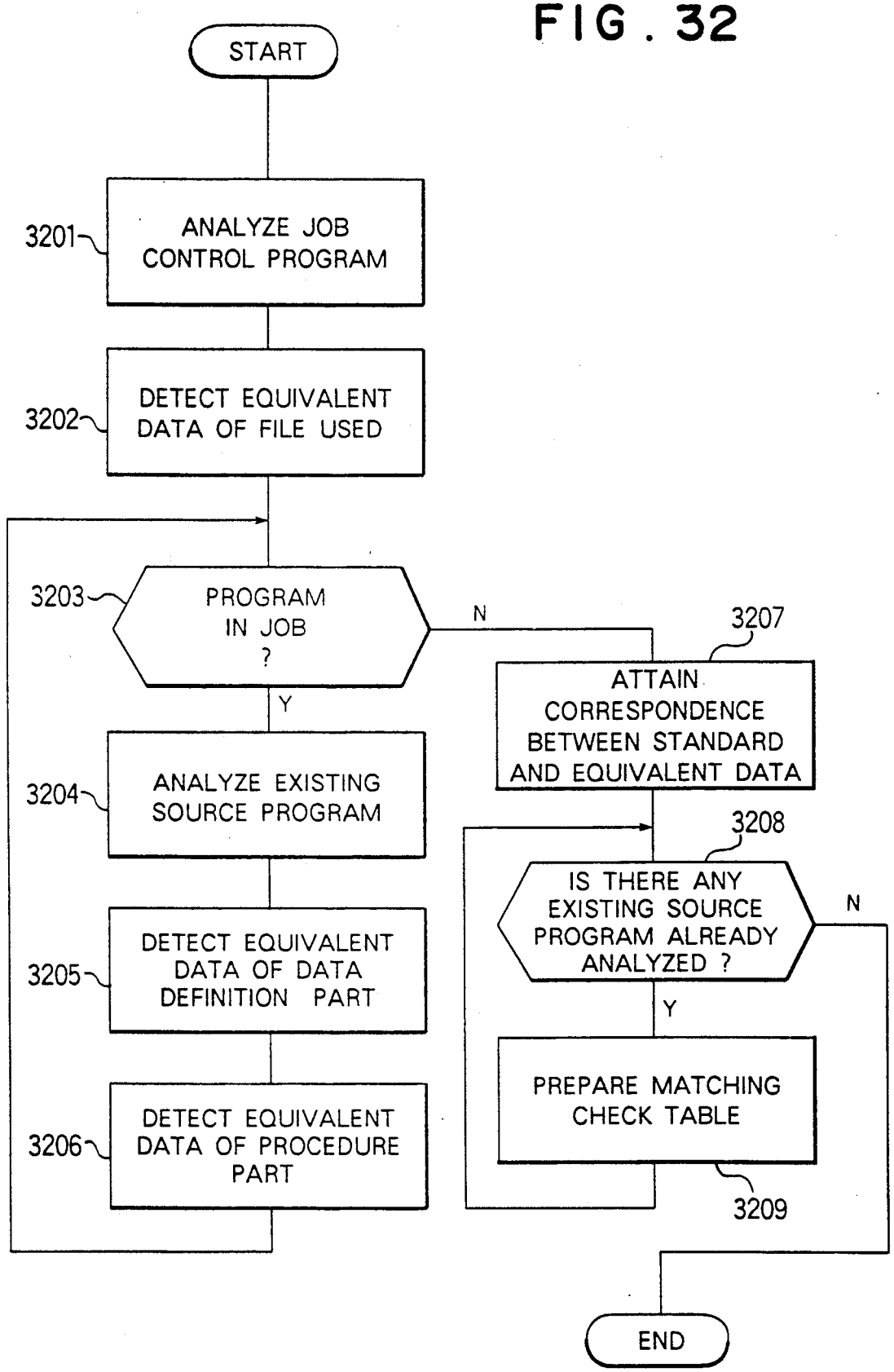
FIG. 32 is a diagram showing steps of processing according to a sixth embodiment.

FIG. 32 is a diagram showing steps of processing according to a sixth embodiment. In this embodiment, a matching check table for the equivalent data information is outputted in response to an existing source applied as an input thereto, and an object thereof is to determine the degree to which the data involved in the software has been standardized. The steps 3201 to 3208 are similar to the corresponding ones in FIG. 23, in which an existing source applied as an input is analyzed to prepare a correspondence table indicating the equivalence relationship between the data shown in FIG. 27. The standard data thus prepared is collated with the correspondence table indicating the equivalence relationship between the data in FIG. 27 to prepare a matching check table as shown in FIG. 33 (step 3209).

This matching check table includes two specific tables, one (3001) indicating the correspondence with the equivalent data information having a name not coincident with the standard data in the existing data inputted corresponding to the standard data, and the other (3002) indicating the correspondence with the number of equivalent data information having a name not coincident with the standard data for each program. In the case where the standard data name for the equivalent data information with the equivalence number "1" is set to "SALES-SLIP-NO" (2601) shown in FIG. 29, for example, the "SLIP-NO" (3101), "SALES-SLIP" (3105) and "SLIP-NUM" (3110) having the equivalent data "1" in FIG. 27 are all judged as mismatching, so that the correspondence between a mismatched item name and the standard data shown by 3003 in FIG. 33 is produced as an output. Also, in the case where the standard data is set to "GOODS" (2603) in FIG. 24 as against the equivalent data information of the equivalence number "2", only "GOODS" with an equivalence number "2" in FIG. 27 is judged as matching, while "WARE-CODE" (3107) and "GOODS-CODE" (3111) are judged as mismatching, so that a correspondence relationship as shown by 3004 in FIG. 33 is produced as an output.

In similar fashion, in the case where a standard data comprises "SALES-DAY" (2605) for the equivalent data information of the equivalence number "3", "BB-REC" (2607) for the equivalent data information of the equivalence number "4", and "SALES-PRICE" (2609) for the equivalent data information of the equivalence number "5", the correspondence relationship shown by 3005, 3006 and 3007 are produced as an output respectively thereby to prepare a table designated by 3001. Also, as shown in 3001, there are eight pieces of equivalent data information having an item name not coincident with the standard data of the program AA, and three pieces of equivalent data information having an item name not coincident with the standard data of the program BB, so that they are produced as an output to the table 3002 indicating the number of name-mismatched data of the standard data for each program.

Each of the embodiments described above represents an example of the present invention, to which the present invention is of course not confined.

We claim:

1. A method of standardization of data items in an existing software program comprising the steps of:
   detecting a set of data items having a data transfer relationship with each other as a set of mutually equivalent data items by analyzing said existing software program and checking each data transfer relationship of instructions in the existing software program;
   analyzing data definition information of the existing software program, calculating physical relative memory positions of said set of mutually equivalent data items, detecting second data items sharing the same physical memory position as the set of mutually equivalent data items, and including such second data items in the set of mutually equivalent data items;
   determining a name and attribute of a first standard data item for the set of equivalent data items; and, changing the points of use and definition of each data item belonging to the set of equivalent data items in the existing software to the name and attribute of the first standard data item thus determined.

2. The method of software standardization according to claim 1, further comprising the step of detecting a third data item having a data transfer relationship by analysis of the data transfer relationship for a fourth data item sharing the same physical position, and including such data item in the set of mutually equivalent data items.

3. The method of software standardization according to claim 2, further comprising the step of detecting a fifth data item having the data transfer relationship and a sixth data item sharing the same physical position by calculating the physical relative positions of the fifth and sixth data items and including such data items in the set of mutually equivalent data items.

4. The method of software standardization according to claim 3, further comprising the step of comparing a relationship in physical position and length between a source data item and a seventh data item sharing the same physical position therewith with the relationship in physical position and length between said seventh data item and further data items having a data transfer relationship therewith, detecting the further data items having no data transfer relationship with the source data item and thereby preparing a set of equivalent data items not including the data items having no transfer relationship with the source data item.

5. The method of software standardization according to claim 4, further comprising the step of detecting a physical same one file of all files defined by a job control parameter program analysis and a command procedure program analysis, detecting data items belonging to said physical same one file and sharing a physical position, and including such data items in the set of mutually equivalent data items.

6. The method of software standardization according to claim 5, further comprising the step of detecting the transfer of a plurality of data items to a given data item, and querying a user information indicating that a possibility of being an equivalent data item is low in such a case.

7. The method of software standardization according to claim 6, further comprising the step of detecting the transfer of a data from a plurality of data items to a given data item, and querying the user the information indicating that the possibility of being an equivalent data item is low in such a case.

8. The method of software standardization according to claim 7, further comprising the step of comparing the data item names, detecting data items having analogous names, and including such data items in the set of mutually equivalent data items.

9. The method of software standardization according to claim 8, further comprising the step of attaching different priority level information to the data items depending on the difference of the method of detecting candidates for equivalent data items and proposing such information to the user.

10. The method of software standardization according to claim 9, further comprising the step of inputting equivalent data item information of an existing software, adding the same information of an existing software, and adding the same information to said equivalent data item information thereby to accumulate the equivalent data item information used for determining the name and attribute of a standard data item.

11. The method of software standardization according to claim 10, further comprising the step of determining the name and attribute of a data item to be used as a standard in advance, and replacing the equivalent data items in an existing software with a corresponding name and attribute of the standard data item for each set of mutually equivalent data items detected by said method.

12. The method of software standardization according to claim 11, further comprising the step of analyzing and extracting the data item information in an existing source program and preparing the name and attribute of the data item used as a standard by correcting said information as required.

13. The method of software standardization according to claim 12, further comprising the step of detecting equivalent data items, collating a set of mutually equivalent data items with the name and attribute of a standard data item, and producing a result of checking the matching as an output.

14. In a system controlled by a job control program for relating a file having at least one data item define din an existing program to a data set stored in a storage to execute data processing by the use of a processing language, a method of standardizing data items in the existing program having a procedure part and a data definition part stored in the storage, comprising the steps of:
 storing in the storage names of data items of a transfer source item and a destination item in relation to data transfers designated in a plurality of data transfer instructions in the existing program;
 attaching a corresponding equivalence number to the name of the transfer source item and destination item in each of the plurality of data transfer instructions;
 determining whether a plurality of files assigned in the data definition part are defined in a single data set and attaching the file equivalence number to the plurality of files in the storage;
 storing the starting position and length of each of the data items in the storage on the basis of the definition of the data length for the data item names in the data definition part; and,
 changing the names of the data items on the basis of the equivalence number, the starting position and length stored in the storage.

15. The method of standardization according to claim 14, further comprising the step of attaching the equivalence number to a selected one of the other source item and the other destination item in the transfer for the transfer instruction designating a transfer of the data items carrying the equivalence number.

16. The method of standardization according to claim 14, further comprising the step of attaching the equivalence number to a selected one of another source item and another destination item in the transfer for another transfer instruction designating the transfer of the data items having the same starting position and length as said ones.

17. The method of standardization according to claim 14, further comprising the step of attaching the same equivalence number to analogous data items, the analogous data items being different from each other.

18. A method of standardizing data items in an existing program having a plurality of procedure parts and a plurality of data definition parts, by using a computer having a storage, the existing program being stored in said storage, the method comprising the steps of:

storing in said storage names of source data items and destination data items in the existing program for data movement between the data items of the source data items and the destination data items in relation to a transfer designated in a plurality of data transfer instructions in the existing program;

attaching to the destination data items an equivalence number corresponding to the transfer source data item for each of the plurality of data transfer instructions;

storing starting position data and length data for each of the data items in the storage on the basis of a data length definition for each data item name in the data definition part; and, changing the name of selected data items on the basis of the equivalence number, the starting position and length stored in the storage.

19. The method of standardization according to claim 18, further comprising the step of attaching the equivalence number to a selected one of the other source data items and destination data items in the transfer of the transfer instruction designated for transfer of the data item carrying the equivalence number.

20. The method of standardization according to claim 18, further comprising the step of attaching the equivalence number to a selected one of another source data item and another destination data item in the transfer of another transfer instruction for designating the transfer of a data item having the same starting position and the same length as said ones.

* * * * *